United States Patent
Singh et al.

(10) Patent No.: US 8,873,440 B2
(45) Date of Patent: Oct. 28, 2014

(54) MAINTAINING DIFFERENT VIRTUAL ACTIVE SETS FOR DIFFERENT CELL TYPES

(75) Inventors: Damanjit Singh, San Diego, CA (US); Andrei Dragos Radulescu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 13/073,049

(22) Filed: Mar. 28, 2011

(65) Prior Publication Data

US 2012/0076018 A1 Mar. 29, 2012

Related U.S. Application Data

(60) Provisional application No. 61/318,687, filed on Mar. 29, 2010, provisional application No. 61/352,739, filed on Jun. 8, 2010.

(51) Int. Cl.
| | |
|---|---|
| *H04B 7/00* | (2006.01) |
| *H04W 36/00* | (2009.01) |
| *H04W 84/04* | (2009.01) |

(52) U.S. Cl.
CPC ........ H04W 36/0083 (2013.01); *H04W 84/045* (2013.01)
USPC .................................... 370/310; 370/252

(58) Field of Classification Search
USPC ....................................................... 370/252
See application file for complete search history.

(56) References Cited

U.S. PATENT DOCUMENTS

| | | | | |
|---|---|---|---|---|
| 6,845,238 | B1 * | 1/2005 | Muller | 455/436 |
| 7,747,275 | B2 * | 6/2010 | Funnell et al. | 455/525 |
| 8,340,705 | B2 * | 12/2012 | Liu et al. | 455/513 |
| 2003/0026233 | A1 * | 2/2003 | Ohsuge | 370/342 |
| 2004/0032845 | A1 | 2/2004 | Chen | |
| 2004/0196793 | A1 * | 10/2004 | Lucidarme et al. | 370/252 |
| 2008/0167026 | A1 * | 7/2008 | Eckert et al. | 455/418 |
| 2009/0059871 | A1 * | 3/2009 | Nader et al. | 370/337 |
| 2010/0208604 | A1 * | 8/2010 | Kazmi et al. | 370/252 |
| 2011/0096692 | A1 * | 4/2011 | Liu et al. | 370/252 |
| 2011/0136489 | A1 * | 6/2011 | Funnell et al. | 455/436 |
| 2012/0014267 | A1 * | 1/2012 | Gomes et al. | 370/252 |

(Continued)

FOREIGN PATENT DOCUMENTS

| | | |
|---|---|---|
| JP | 2003509982 | 3/2003 |
| JP | 2013516918 A | 5/2013 |

(Continued)

OTHER PUBLICATIONS

Testing Intra-frequency Measurements for Soft Handover, Oct. 1999 (TSG-RAN WG4 meeting #8).*

(Continued)

*Primary Examiner* — Hassan Kizou
*Assistant Examiner* — Deepa Belur

(57) ABSTRACT

To facilitate inbound mobility for an access terminal, different virtual active sets are employed for different types of access points or cells (e.g., HNBs versus macro cells). In addition, different lists of permitted cells are maintained for these different types of access points or cells. Also, a frequency quality estimate for inter-frequency event triggering may be based on measurement of a single cell present in a virtual active set (e.g., a dedicated HNB virtual active set).

44 Claims, 13 Drawing Sheets

(56) References Cited

U.S. PATENT DOCUMENTS

| | | | |
|---|---|---|---|
| 2012/0087269 A1* | 4/2012 | Hussein et al. | 370/252 |
| 2012/0281585 A1* | 11/2012 | Zhang et al. | 370/252 |
| 2012/0294179 A1* | 11/2012 | Tafreshi | 370/252 |

FOREIGN PATENT DOCUMENTS

| | | | | |
|---|---|---|---|---|
| SE | WO0120942 | * | 3/2001 | H04W 36/18 |
| WO | WO0120942 | | 3/2001 | |
| WO | 2008157817 A1 | | 12/2008 | |
| WO | 2011085204 A1 | | 7/2011 | |

OTHER PUBLICATIONS

Ericsson et al., "Event triggered CSG inter-frequency measurements", 3GPP Draft; R2-102944, 3rd Generation Partnership Project (3GPP), Mobile Competence Centre; 650, Route Des Lucioles; F-06921 Sophia-Antipolis Cedex;France, vol. RAN WG2, no. Montreal, Canada; May 10, 2010, May 3, 2010, XP050423063, [retrieved on May 3, 2010].

International Search Report and Written Opinion—PCT/US2011/030381, ISA/EPO—Jun. 20, 2011.

Potevio: "Considerations on Feedback Schemes for Codebook-based MU-MIM0 in LTE-A", 3GPP Draft; R1-094804, 3rd Generation Partnership Project (3GPP), Mobile Competence Centre; 650, Route Des Lucioles; F-06921 Sophia-Antipolis Cedex; France, no. Jeju; Nov. 9, 2009, XP050389200, [retrieved on Nov. 3, 2009].

Qualcomm Incorporated: "Event-triggered reporting for CSG inter-frequency measurements", 3GPP Draft; R2-102388 Eventtriggering_Discpaper, 3rd Generation Partnership Project (3GPP), Mobile Competence Centre; 650, Route Des Lucioles; F-06921 Sophia-Antipolis Cedex; France, vol. RAN WG2, no. Beijing, china; Apr. 12, 2010, Apr. 6, 2010, XP050422662, [retrieved on Apr. 6, 2010].

Universal Mobile Telecommunications, System (UMTS); Radio Resourse Control, (RRC); Protocol specification (3GPP TS 25.331 version 9.1.0 Release 9), Technical Specification, European Telecommunications Standards Institute (ETSI), 650, Route Des Lucioles; F-06921 Sophia-Antipolis; France, vol. 3GPP RAN 2, No. V9.1.0, Feb. 1, 2010, XP014046584, p. 461-p. 467 p. 1684-p. 1685, paragraph 14.7a p. 1688, paragraph 14.11.1—p. 1690, paragraph 14.11.2.

* cited by examiner

MAINTAINING DIFFERENT VIRTUAL ACTIVE SETS FOR DIFFERENT CELL TYPES

CLAIM OF PRIORITY

This application claims the benefit of and priority to commonly owned U.S. Provisional Patent Application No. 61/318,687, filed Mar. 29, 2010, and U.S. Provisional Patent Application No. 61/352,739, filed Jun. 8, 2010, the disclosure of each of which is hereby incorporated by reference herein.

BACKGROUND

1. Field

This application relates generally to wireless communication and more specifically, but not exclusively, to maintaining virtual active sets.

2. Introduction

A wireless communication network may be deployed over a defined geographical area to provide various types of services (e.g., voice, data, multimedia services, etc.) to users within that geographical area. In a typical implementation, access points (e.g., corresponding to different cells) are distributed throughout a network to provide wireless connectivity for access terminals (e.g., cell phones) that are operating within the geographical area served by the network.

In general, at a given point in time, the access terminal will be served by a given set of one or more cells. Over time, the signal quality seen by the access terminal may change, whereby the access terminal may be better served by a different set of one or more cells. In such a case, to maintain mobility for the access terminal, the access terminal may be handed-over from its serving cell set to the other cell set.

To facilitate this mobility, the network may instruct the access terminal to measure signals (e.g., beacon/pilot signals) from cells on the current serving frequency and on other frequencies. The network then uses the signal quality of the measured signals to determine whether the access terminal should remain on its current serving cell set or switch to another cell set. These measurements may be periodic or event-triggered. As an example of the latter case, the network may configure an access terminal with one or more parameters (e.g., a threshold) and instruct the access terminal to send a measurement report whenever the measured signal quality meets the criteria specified by the parameter(s) (e.g., signal quality exceeds the threshold).

In some implementations, a network may support soft handover of an access terminal. In such a case, the access terminal maintains concurrent connections (e.g., radio links) with multiple cells on the serving frequency. The cells with which the access terminal maintains these connections are referred to as the active set.

As mentioned above, apart from the serving frequency, there are other frequencies that may be available to an access terminal. Consequently, an access terminal may maintain other active sets corresponding to these other frequencies. Each of these active sets is referred to as a "virtual" active set (VAS) because an access terminal generally does not actively maintain connections with the cells listed in the VAS. Rather, the VAS on a particular frequency, e.g., frequency j, is generally understood to be the active set that is expected to be used if the access terminal were to be camped on the frequency j. A single VAS is defined for a given one of these other frequencies.

The VASs are used in conjunction with the active set to determine whether to leave an access terminal on its current serving frequency or to hand the access terminal over to one of the other frequencies. For example, the access terminal may measure certain signal quantities (e.g., Ec/Io) from the cells listed in the active set and each VAS and generate a corresponding quality estimate for each frequency based on an average of the measured signal quantities. From the resulting set of frequency quality estimates, a determination may be made as to which frequency will provide the best service for the access terminal. An example of a VAS is described in the 3GPP document TS 25.331 at Section 14.11.

As the demand for high-rate and multimedia data services rapidly grows, there lies a challenge to implement efficient and robust communication systems with enhanced performance. To supplement conventional network access points (e.g., macro access points), small-coverage access points may be deployed (e.g., installed in a home or workplace) to provide more robust indoor wireless coverage or other coverage to access terminals. Such small-coverage access points may be referred to as, for example, femto access points, femto cells, Home NodeBs (HNBs), Home eNodeBs (HeNBs), or access point base stations. Typically, such small-coverage access points are connected to the Internet and the mobile operator's network via a DSL router or a cable modem. For convenience, small-coverage access points may be collectively referred to as HNBs (or HNB cells) in the discussion that follows.

Access points such as HNBs may be configured to support different types of access modes. For example, in an open access mode, an access point may allow any access terminal to obtain any type of service via the access point. In a restricted (or closed) access mode, however, an access point may only allow authorized access terminals to obtain service via the access point. For example, an access point may only allow access terminals (e.g., so called home access terminals) belonging to a certain subscriber group (e.g., a closed subscriber group (CSG)) to obtain service via the access point. In a hybrid access mode, alien access terminals (e.g., non-home access terminals, non-CSG access terminals) may only be allowed to obtain access via the access point under certain conditions. For example, a macro access terminal that does not belong to a HNB's CSG may be allowed to access the HNB only if the HNB is not currently serving a home access terminal. For convenience, a cell (e.g., a HNB) that is associated with one or more CSGs may be referred to as a CSG cell in the discussion that follows.

In practice, various problems may arise in a system that employs HNBs (CSG cells) and VASs. These problems may arise in a co-channel deployment where HNBs and one or more macro cells operate on the same frequency or in a dedicated channel deployment where HNBs operate on a different frequency (e.g., a dedicated frequency) than macro cells.

In a co-channel deployment, false event trigging may occur for an access terminal that is not interested in HNB coverage (hereafter referred to as a macro access terminal, for convenience) or for an access terminal that is interested in HNB coverage (hereafter referred to as a HNB access terminal, for convenience). This false triggering may occur as a result of HNBs and macro cells being included in the VAS. In this case, a frequency quality estimate based on this VAS may be incorrect.

For example, if there is poor macro cell quality but good HNB quality on another (non-serving) frequency, a relatively high overall frequency quality estimate may be indicated for this other frequency. Thus, a macro access point that is only interested in macro coverage may be handed-over to the other frequency where the macro coverage is poor (e.g., worse than on the serving frequency).

Conversely, if there is good macro cell quality but poor HNB quality on another (non-serving) frequency, a relatively high overall frequency quality estimate may again be indicated for this other frequency. However, a HNB access terminal that is only interested in HNB coverage may be handed-over to the other frequency where the HNB coverage is poor (e.g., worse than the macro coverage on the serving frequency).

If HNBs are not included in a VAS to avoid the adverse impact on macro access terminal mobility discussed above, a HNB access terminal may not be handed-over to a frequency with HNBs in cases where such a handover is desired. For example, if there is poor macro cell quality but good HNB quality on another (non-serving) frequency, the HNB access terminal may be left on the current serving frequency because a poor frequency quality estimate would be reported for the other frequency.

In a dedicated channel deployment, various problems may arise in conjunction with HNB access. For example, a frequency quality estimate based on multiple HNBs may be incorrect. Here, if there is poor quality for a user's HNB (e.g., a HNB associated with a CSG) but high quality for a neighbor HNB, a relatively high overall frequency quality estimate may be indicated for the dedicated HNB frequency. Thus, a HNB access terminal that is only interested in its home HNB coverage may be handed-over to the HNB frequency in a case where the home HNB coverage is poor (e.g., worse than the macro coverage on the current serving frequency).

As another example, if collectively the quality appears high for enterprise-based HNBs (e.g., HNBs provided at a work site), but on an individual basis the quality of each HNB is poor, a relatively high overall frequency quality estimate may be indicated for the dedicated HNB frequency. Thus, a HNB access terminal may be handed-over to the HNB frequency in a case where the HNB coverage is actually poor (e.g., worse than the macro coverage on the current serving frequency).

Moreover, the cells that are allowed to be included in a VAS for an access terminal are typically limited to the cells that are specified by the network. For example, the network may send an Intra-frequency cell info list and an Inter-frequency cell info list that specify the cells that the access terminal may include in a CELL_INFO_LIST or a neighbor cell list (NCL). However, this limits the number of primary scrambling codes (PSCs) that may be used by the HNBs on the dedicated frequency. Given that there may be a relatively large number of HNBs deployed on the dedicated frequency (e.g., hundreds or more), this may increase the probability of PSC confusion on the dedicated frequency.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

The disclosure relates in some aspects to maintaining different VASs for different types of access points or cells. For example, for a given frequency, an access terminal may maintain one VAS solely for HNBs (e.g., CSG cells, hybrid cells, open cells associated with HNBs) and another VAS for any other types of cells (e.g., macro cells). Thus, an access terminal that is interested in being handed-over to a HNB (CSG cell) on another frequency may use the dedicated VAS (e.g., referred to herein as the HNB VAS or CSG VAS) for inter-frequency event triggering. Conversely, an access terminal that is interested in being handed-over to some other type of cell (e.g., a macro cell) on that other frequency may use the other VAS for inter-frequency event triggering.

The disclosure relates in some aspects to defining different lists of permitted cells for different types of access points or cells. For example, an access terminal may maintain a CELL_INFO_CSG_LIST that is dedicated for HNBs (e.g., open HNBs, CSG cells, hybrid cells) and maintain a CELL_INFO_LIST that is dedicated for non-HNBs (e.g., macro cells). The access terminal configures these lists based on cell information received from the network. For example, for a given frequency, the network may provide a CSG Inter-frequency cell info list and a CSG Intra-frequency cell info list that specify the HNB cells (e.g., open HNBs, CSG cells, hybrid cells) that the access terminal may include in its CELL_INFO_CSG_LIST. In addition, the network may provide an Intra-frequency cell info list and an Inter-frequency cell info list that specify the non-HNB (e.g., macro) cells that the access terminal may include in its CELL_INFO_LIST. Thus, a HNB VAS (CSG VAS) may include any cell listed in the CELL_INFO_CSG_LIST, while another VAS may include any cell listed in the CELL_INFO_LIST. In this way, a larger number of PSCs are available for use by the HNBs (CSG cells) on a given frequency.

The disclosure relates in some aspects to determining a frequency quality estimate for inter-frequency event triggering based on measurement of a single HNB (CSG cell). In some implementations, this is achieved by using a HNB VAS (CSG VAS) with a predefined size of one cell. In some implementations, this is achieved by using only the best cell from a HNB VAS (CSG VAS) for inter-frequency event triggering. In either case, a handover decision may therefore be based on the quality of the actual cell to which an access terminal would likely be handed-over, rather than based on the collective quality of all of the HNB cells (CSG cells) on that frequency.

Through the use of these and other techniques as taught herein, access terminal inbound mobility to certain types of cells (e.g., HNBs) may be improved. For example, the use of the disclosed techniques may increase the likelihood that upon conducting an inter-frequency handover, an access terminal will receive the coverage that was expected at the new frequency.

BRIEF DESCRIPTION OF THE DRAWINGS

These and other sample aspects of the disclosure will be described in the detailed description and the appended claims that follow, and in the accompanying drawings, wherein:

Figure 1:
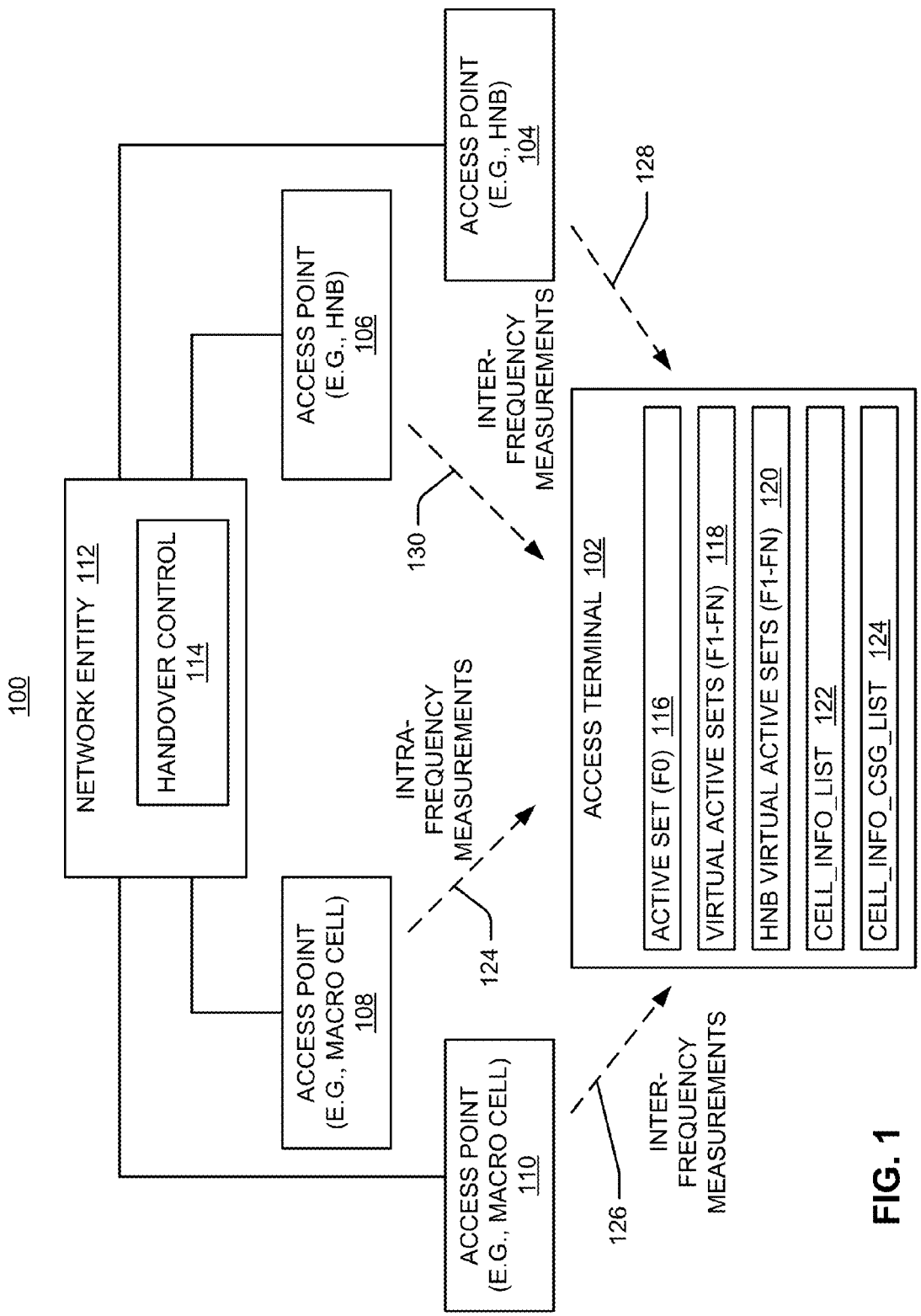
FIG. 1 is a simplified block diagram of several sample aspects of a communication system where an access terminal may maintaining an active set and different types of VASs.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, macro cells, Home NodeBs, Home eNodeBs, CSG cells, femto cells, and so on, while access terminals may be referred to or implemented as user equipment (UEs), mobile stations, and so on.

Access points in the system 100 provide access to one or more services (e.g., network connectivity) for one or more wireless terminals (e.g., an access terminal 102) that may be installed within or that may roam throughout a coverage area of the system 100. For example, at various points in time the access terminal 102 may connect to any of the access points 104-110, or some access point in the system 100 (not shown). Each of these access points may communicate with one or more network entities (represented, for convenience, by a network entity 112) to facilitate wide area network connectivity.

These network entities may take various forms such as, for example, one or more radio and/or core network entities. Thus, in various implementations the network entities may represent functionality such as at least one of: network management (e.g., via an operation, administration, management, and provisioning entity), call control, session management, mobility management, gateway functions, interworking functions, or some other suitable network functionality. In some aspects, mobility management relates to controlling (e.g., initiating and handling) handover of an access terminal from one access point (cell) to another. To this end, the network entity 112 is depicted in FIG. 1 as comprising at least one component for handover control 114. In some aspects, mobility management relates to: keeping track of the current location of access terminals through the use of tracking areas, location areas, routing areas, or some other suitable technique; controlling paging for access terminals; and providing access control for access terminals. Two of more of these network entities may be co-located and/or two or more of these network entities may be distributed throughout a network.

The access points 104 and 106 may comprise, for example, HNBs (e.g., including HeNBs, CSG cells, hybrid cells, open HNBs, femto cells, femto access points, and so on) or some other type of cell that provides different service (e.g., coverage) than a macro cell. For convenience, these types of cells may simply be referred to as HNBs in the discussion that follows. It should be understood, however, that the disclosed concepts are not limited to HNBs.

The disclosure relates in some aspects to maintaining an active set and different types of VASs that are used for mobility-related operations performed by the access terminal 102. In accordance with conventional practice, the access terminal 102 maintains an active set 116 for the current serving frequency F0 (hereafter referred to as the used frequency, for convenience). In addition, the access terminal 102 maintains N VASs 118 for other frequencies F1-FN (hereafter referred to as the non-used frequencies, for convenience) on which the access terminal 102 may receive service. However, the VASs 118 do not include HNBs. Rather, in accordance with the teachings herein, the access terminal 102 maintains dedicated VASs 120 for the HNBs on the non-used frequencies. That is, each dedicated VAS 120 will only include HNBs (i.e., include the identifiers assigned to the HNBs). For convenience, a dedicated VAS such as this may simply be referred to as a HNB VAS (or CSG VAS) in the discussion that follows. It should be understood, however, that the disclosed VAS concepts are not limited to HNB VASs.

The access terminal 102 also maintains cell lists received from the network (e.g., from the network entity 112). For example, the access terminal 102 may maintain a CELL_INFO_LIST 122 that specifies which cells may be included in the VASs 118 (e.g., for a given non-used frequency). However, the CELL_INFO_LIST 122 used for the VASs 118 does not include HNBs. Rather, in accordance with the teachings herein, a CELL_INFO_CSG_LIST 124 is used to specify the HNBs that may be included in the HNB VAS 120 (e.g., for a given non-used frequency).

The implementation of a dedicated HNB VAS in conjunction with an active set and other VASs will be described in more detail in conjunction with the flowchart of FIG. 2. Specifically, FIG. 2 describes how the active set and VASs are maintained and how they are used to trigger mobility events.

Figure 2:
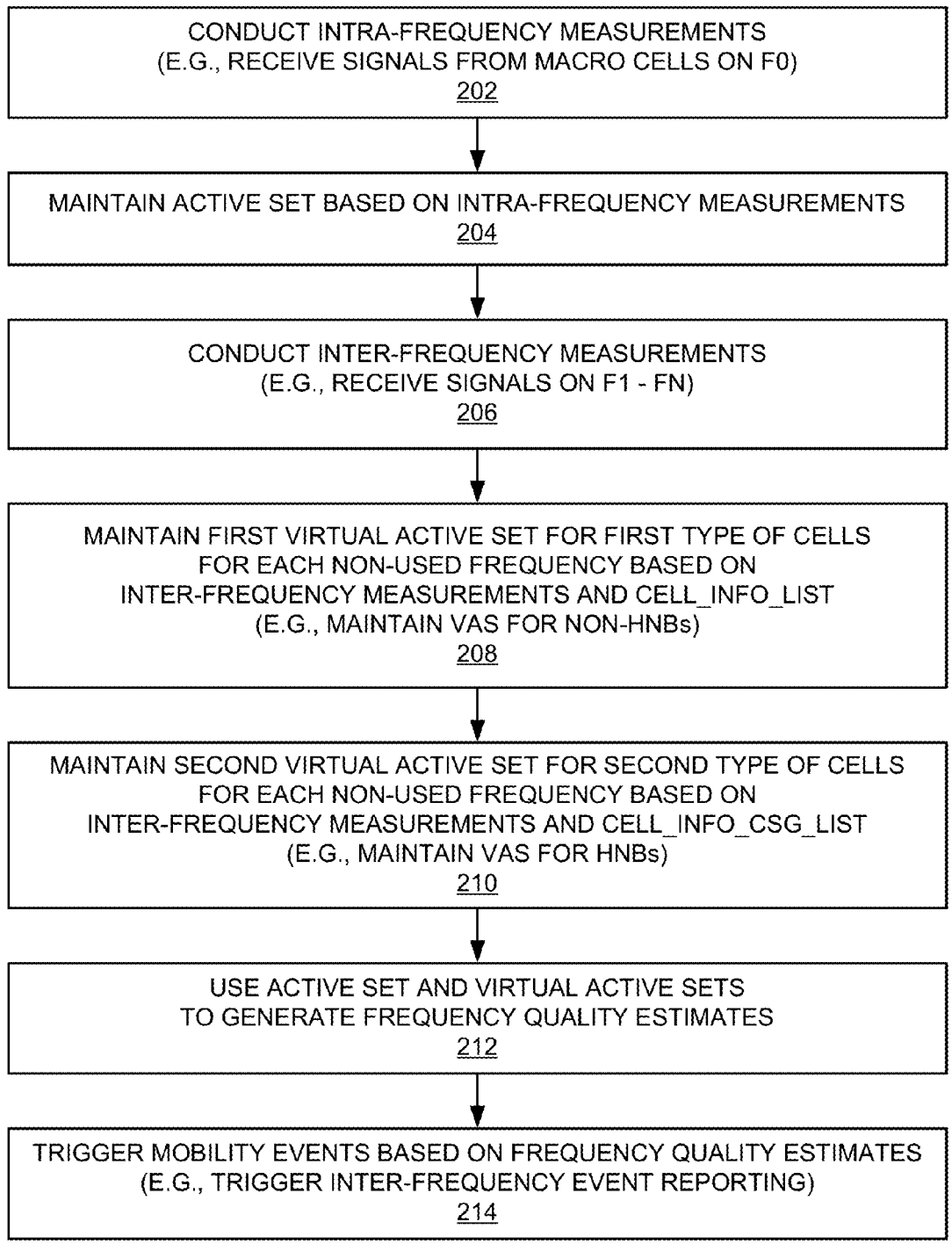
FIG. 2 is a flowchart of several sample aspects of operations that may be performed in conjunction with maintaining an active set and different types of VASs.
Figure 7:
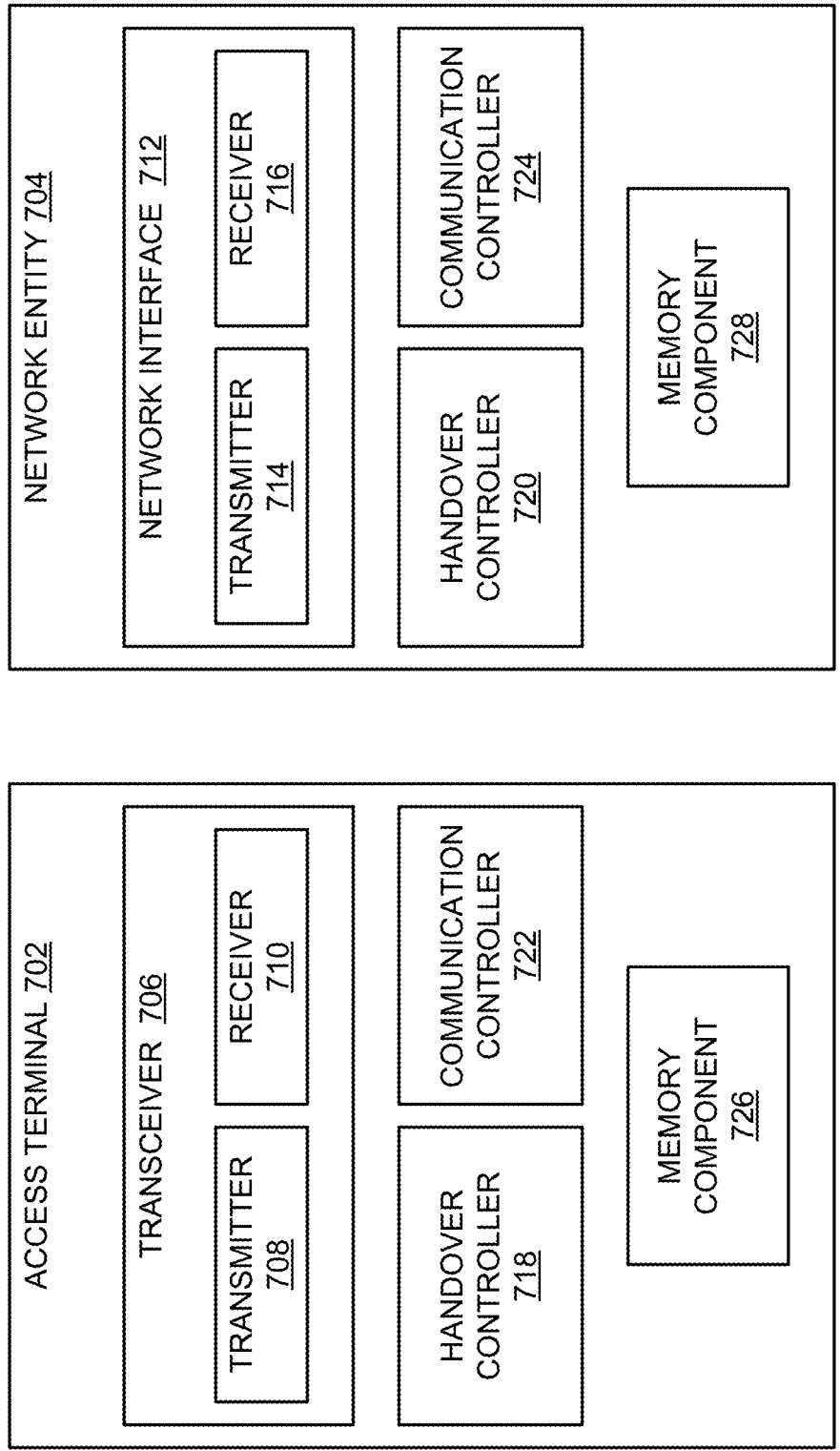
FIG. 7 is a simplified block diagram of several sample aspects of components that may be employed in communication nodes.

For convenience, the operations of FIG. 2 (or any other operations discussed or taught herein) may be described as being performed by specific components (e.g., the components of FIG. 1 or FIG. 7). It should be appreciated, however, that these operations may be performed by other types of components and may be performed using a different number of components. It also should be appreciated that one or more of the operations described herein may not be employed in a given implementation.

As represented by block 202 of FIG. 2, the access terminal 102 repeatedly conducts intra-frequency measurements over time to identify nearby cells on the used frequency. In the simplified example of FIG. 1, intra-frequency measurements based on signals transmitted by one or more cells of the access point 108 are represented by the dashed line 124. It should be appreciated that similar measurements may be conducted based on signals received from cells of other access points on frequency F0. In conjunction with these measurements, the access terminal 102 determines one or more quality metrics associated with received signals from each of the cells on F0. Here, a quality metric may comprise, for example, an indication of received pilot strength (e.g., Ec/Io), an indication of received signal code power (RSCP), or some other suitable metric.

As represented by block 204, the access terminal 102 selects a set of cells to be included in the active set 116 based on, for example, the quality metrics associated with the cells identified at block 202. For example, the access terminal 102 may include the cells having the best signal quality in the active set 116. Here, the number of cells included in the active set may be constrained by a maximum active set size. Based on intra-frequency measurements made over time, the access terminal 102 maintains the active set 116 by adding and removing cells on the network entity's request, as the relative quality of the received signals from those cells improves and degrades.

As represented by block 206, the access terminal 102 also conducts inter-frequency measurements to identify nearby cells on each non-used frequency. For example, for each frequency F1-FN, the access terminal 102 may identify the macro cells and HNBs on that frequency and determine quality metrics of those macro cells and HNBs based on the signals received at the access terminal 102. In the simplified example of FIG. 1, inter-frequency measurements based on signals transmitted by one or more cells of the access point 110 are represented by the dashed line 126. Similarly, inter-frequency measurements based on signals transmitted by one or more cells of the access points 104 and 106 are represented by the dashed lines 128 and 130, respectively. It should be appreciated that similar measurements may be conducted based on signals received from cells of other access points (not shown) on each non-used frequency.

As represented by block 208, the access terminal 102 maintains the VASs 118 based on the inter-frequency measurements of block 206 and the CELL_INFO_LIST 122. For example, the access terminal 102 may select the macro cells to be included in the VAS 118 for a given non-used frequency based on the signal quality associated with a set of macro cells that: 1) were identified on that frequency at block 206; and 2) are present in the CELL_INFO_LIST 122.

The VAS 118 is updated by the access terminal 102 in accordance with the occurrence of certain events (e.g., 3GPP Events 1a, 1b, and 1c). Here, Event 1a is used to add a cell to the VAS 118, Event 1b is used to remove a cell from the VAS 118, and Event 1c is used to replace a cell in the VAS 118. These events are triggered based on the intra-frequency measurements made by the access terminal 102. That is, when changes occur in certain measurement quantities corresponding to cells on the frequency associated with a given VAS 118, the access terminal 102 executes an appropriate change in the VAS 118 to add, delete, or replace a cell in accordance with the event. For example, when a measurement quantity corresponding to a cell that is not a member of the VAS 118 exceeds a certain threshold, an Event 1a may be triggered and that cell may be added to the VAS 118. When a measurement quantity corresponding to a cell that is a member of the VAS 118 falls below a certain threshold, an Event 1b may be triggered and that cell may be removed from the VAS. When a measurement quantity corresponding to a cell that is not a member of the VAS 118 exceeds a certain threshold and the active set is full, an Event 1c may be triggered to replace a cell in the VAS 118 with a new cell.

As represented by block 210, the access terminal 102 maintains the HNB VASs 120 based on the intra-frequency measurements of block 206 and the CELL_INFO_CSG_LIST 124. For example, the access terminal 102 may select the HNBs to be included in the HNB VAS 120 for a given non-used frequency based on the signal quality associated with a set of HNBs that: 1) were identified on that frequency at block 206; and 2) are present in the CELL_INFO_CSG_LIST 124.

As represented by block 212, the access terminal 102 uses the active set 116, the VASs 118, and the HNB VASs 120 to repeatedly (e.g., periodically) generate quality estimates for each frequency over time. Specifically, the access terminal 102 conducts measurements for the cells listed in the active set 116 to provide a quality estimate for the used frequency. For example, the frequency quality estimate may be computed based on an average of the power levels of all the cells listed in the active set 116. The access terminal 102 also conducts measurements for the cells listed in the VASs 118 to provide first cell(s) quality estimate (non-HNB-based quality estimate) for each of the non-used frequencies. Here, a quality estimate for a given frequency may be computed based on, for example, an average of the power levels of all the cells listed in the VAS 118 for that frequency. An example of a computation of a frequency quality estimate for a VAS is described in 3GPP TS 25.331, Section 14.2.0b. Finally, the access terminal 102 conducts measurements for the cells listed in the VASs 120 to provide a second quality estimate (HNB-based quality estimate) for each of the non-used frequencies. As discussed in more detail below, a HNB-based quality estimate for a given frequency may be based on signals received from a single HNB on that frequency (e.g., the only cell or the best cell listed in the corresponding HNB VAS 120).

As represented by block 214, once the frequency quality estimates are generated, a mobility event may be triggered if specified conditions relating to those estimates are met. For example, an inter-frequency event may be triggered if the quality estimate for a non-used frequency is above a threshold, is below a threshold, or exceeds the quality estimate for the used frequency. Also, triggering of such an event may be based on whether the quality estimate for a non-used frequency exceeds a threshold for a particular duration of time.

As a specific example, the frequency quality estimates discussed above are used to determine if the access terminal 102 should send measurement reports to the network. The network may then use the measurement report information to determine whether the access terminal 102 should be handed-over to a cell (or set of cells) operating on a non-used frequency. For example, handover of an access terminal to a current non-used frequency may be triggered if the frequency quality estimate of the non-used frequency exceeds the frequency quality estimate of the used frequency by at least a defined amount for at least a defined period of time. In a typical implementation, the defined amount corresponds to a hysteresis parameter and the defined period of time corresponds to a time-to-trigger (TTT) parameter.

Several sample scenarios that illustrate advantages of using dedicated HNB VASs follow. In a first scenario, the access terminal 102 is only subscribed for macro cell access in the current zone. Here, if the access terminal 102 is currently being served by the access point 108 and other access points on F0, the access terminal 102 may conduct measurements on the cells listed in the active set 116 and the VASs 118 to provide quality estimates for each frequency. Advantageously, no HNBs are listed in any of these sets. Consequently, the access terminal 102 is able to trigger the sending of a measurement report based solely on macro cell quality estimates. As a result, if an inter-frequency handover (e.g., to the frequency on which the access point 110 is operating) is indicated by the network based on such a measurement report, there is a greater likelihood that the handover will result in better service for the access terminal 102 as compared to an implementation where the frequency quality estimates are also based on HNBs (e.g., where HNBs and macro cells are included in the same VAS). This is because, in the first scenario, the presence of any HNBs on the target frequency will not affect the quality estimate for the macro cells on that frequency.

In a second scenario, the access terminal 102 is subscribed for HNB access in the current zone. Here, if the access terminal 102 is currently being served by the access point 108 and other access points on F0, the access terminal 102 may conduct measurements on the cells listed in the active set 116, the VASs 118, and the HNB VASs 120 to provide quality estimates for each frequency. In this case, separate quality estimates are provided for HNBs and non-HNBs on the non-used frequencies. Thus, a decision to trigger a measurement report may be based on a first set of quality estimates for macro cells on the non-used frequencies and a second set of quality estimates for HNBs on the non-used frequencies. As a result, if an inter-frequency handover is indicated based on reporting of the second set of quality estimates (HNBs only), there is a greater likelihood that the handover will result in better service for the access terminal 102 (which is interested in HNB coverage) as compared to an implementation where the frequency quality estimate for that frequency is also based on macro cells. In this case, the presence of any macro cells on that frequency will not affect the quality estimate corresponding to the HNBs on that frequency.

With the above in mind, a more detailed example of how a dedicated HNB VAS may be maintained and used will be described with reference to FIG. 3. Briefly, blocks 302 and 304 relate to configuring an access terminal to provide a HNB VAS, blocks 306 and 308 relate to maintaining a HNB VAS, and blocks 310-314 relate to using the HNB VAS for inbound mobility of the access terminal.

In some implementations, the initialization and/or maintenance of a HNB VAS may be similar to the initialization and/or maintenance of a conventional VAS. For example, an access terminal may set up a HNB VAS when it receives a measurement control message for HNB measurements that includes the information element (IE) "Inter-frequency set update".

Figure 3:
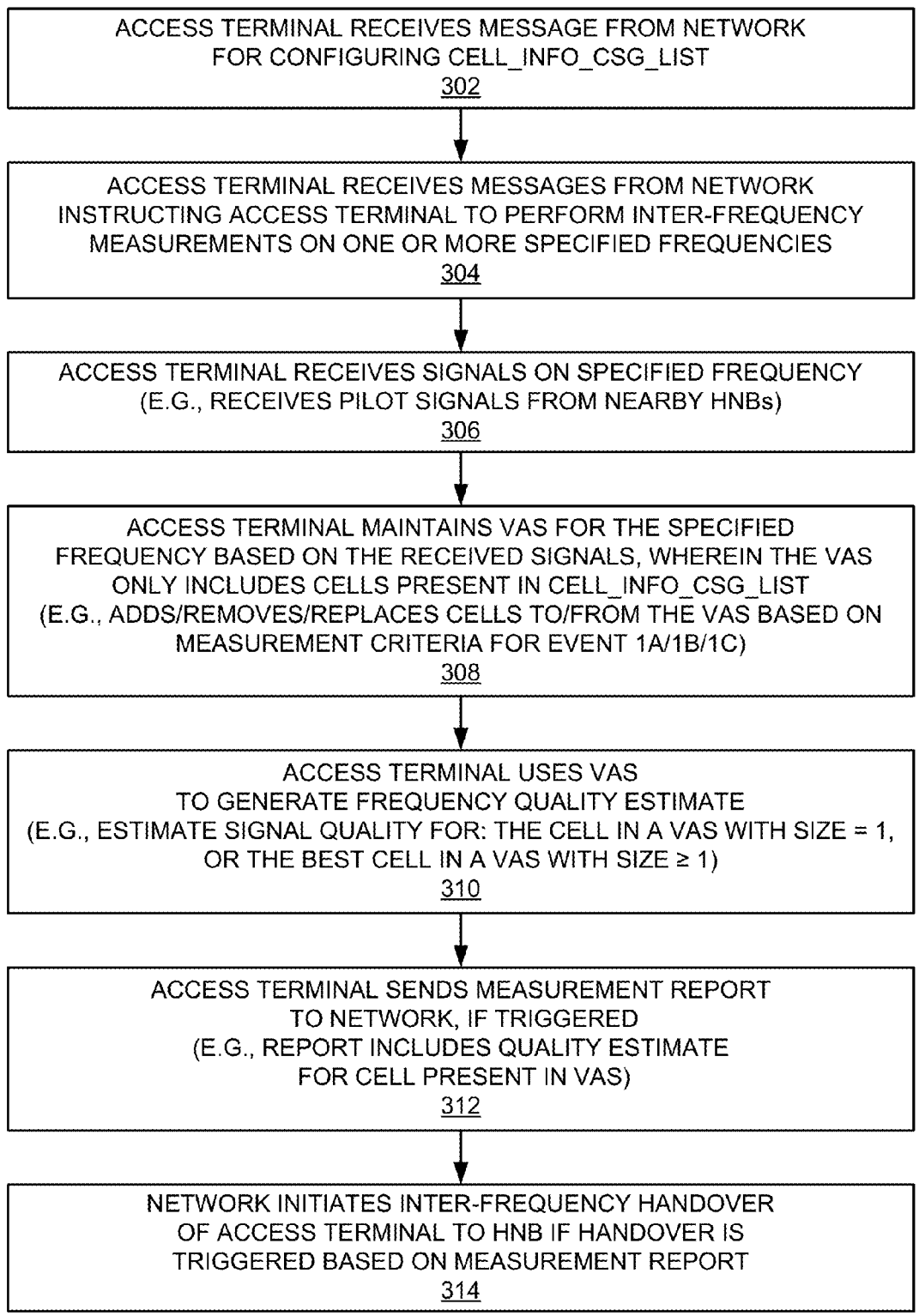
FIG. 3 is a flowchart of several sample aspects of operations that may be performed in conjunction with maintaining and using a HNB VAS (CSG VAS) for inter-frequency event triggering.

As represented by block 302 of FIG. 3, at some point in time, the network configures the access terminal with a list of cells (e.g., a CSG Inter-frequency cell info list and/or a CSG Intra-frequency cell info list) that the access terminal uses to configure the CELL_INFO_CSG_LIST. For example, the access terminal may receive this list (e.g., in an IE) via a measurement control message, a configuration message, or some other suitable message sent by a suitable network entity (e.g., a radio network controller (RNC)).

As represented by block 304, at various points in time, the access terminal receives messages (e.g., measurement control messages) from the network that instruct the access terminal to perform inter-frequency measurements on one or more specified frequencies. This message may specify when the measurements are to occur (e.g., periodically) and how the measurements are to be reported (e.g., periodically or event-triggered). In some implementations, the list of cells that is used to configure the CELL_INFO_CSG_LIST described at block 302 may instead be included in the message of block 304. Such messages may be similar to, for example, the measurement control messages as specified in 3GPP TS 25.367, Section 8.1.

As represented by block 306, the access terminal conducts measurements on one of the specified frequencies by receiving signals on that frequency and processing the signals to identify the signals from HNBs and non-HNBs (e.g., based on cell identifiers of the cells or the PSCs used by the cells). These received signals may comprise, for example, pilot signals or some other suitable signals broadcast by the cells.

As represented by block 308, the access terminal maintains a HNB VAS for each frequency based on the signals received from the HNBs at block 306, where the HNB VAS only includes cells present in the CELL_INFO_CSG_LIST. Accordingly, the type of cells present in the HNB VAS is restricted to HNBs (e.g., CSG cells, hybrid cells, and open HNBs). The HNB VAS may be updated based on the occurrence of certain events. In some implementations, an access terminal uses measurement criteria defined for 3GPP Event 1a, Event 1b, or Event 1c to control membership in a HNB VAS. For example, if the measurement quantity corresponding to a HNB that is not currently in the HNB VAS exceeds a specified Event 1a threshold, an Event 1a may be triggered whereby that HNB is added to the HNB VAS. Similar operations may be performed to remove a cell (Event 1b) or replace a cell (Event 1c).

As discussed herein, in some implementations, the HNB VAS may identify a single cell (HNB) that is to be used for the frequency quality estimate. Accordingly, the network (e.g., a suitable network entity such as an RNC) may configure the HNB VAS to support this desired behavior. In some cases, the size of the HNB VAS is predefined by the network to have a size of 1 (i.e., a size of 1 cell). In other cases, the network does not restrict the size of the HNB VAS to 1 (i.e., the HNB VAS may include 1 or more members). In these other cases, however, the access terminal identifies one cell (e.g., the best cell) from the HNB VAS, whereby only that cell is used for the frequency quality estimate.

An access terminal will therefore maintain a HNB VAS in different ways depending on how the HNB VAS is implemented. For example, for an implementation where the size of the HNB VAS is restricted to 1, the addition of a new cell will result in the removal of the prior cell. This scenario is described in more detail below in conjunction with FIG. 4. For an implementation where the size of the HNB VAS is not restricted to 1, the addition of a new cell may or may not result in the removal of a cell (depending on any size restrictions for the HNB VAS). However, the addition of a new cell may result in the identification of a new best cell. This scenario is described in more detail below in conjunction with FIG. 5.

As represented by block 310 of FIG. 3, the access terminal uses the HNB VAS for a given non-used frequency to generate a quality estimate for that frequency. For implementations where the HNB VAS has a size=1, this may involve, for example, measuring a specified quality metric of the cell. For implementations where the HNB VAS has a size >1, this may involve, for example, measuring a specified quality metric of the best cell in the HNB VAS. Such a quality metric may comprise, for example, Ec/Io, RSCP, or some other suitable metric.

As represented by block 312, the access terminal sends a measurement report to the network whenever such a report is triggered. For example, the sending of a measurement report may be triggered if the HNB-based frequency quality estimate of a non-used frequency exceeds a threshold (e.g., a 3GPP 2x event threshold). This measurement report may include an indication of any frequency quality estimate that triggered the report.

As represented by block 314, the network (e.g., an RNC) may initiate inter-frequency handover if a handover trigger is indicated by the measurement report. For example, handover may be triggered if the HNB-based frequency quality estimate of a non-used frequency exceeds the frequency quality estimate of the currently used frequency in the manner discussed above at block 216.

More effective access terminal mobility may be achieved by using a single HNB from a HNB VAS to generate a frequency quality estimate as taught herein. For example, according to current 3GPP standards, inbound mobility from a macro cell to a Home NodeB only supports a hard handover, not a soft handover. That is, a simultaneous connection between a macro cell and a Home NodeB is not allowed. Thus, according to the existing standards, when camped on a Home NodeB cell, the active set cannot be greater than one cell. Consequently, there is little benefit to be obtained by combining the power levels of a plurality of cells in a HNB VAS (CSG VAS) to obtain a frequency quality estimate for that VAS. Rather, in accordance with the teachings herein, a more useful frequency quality estimate for such a VAS corresponds only to one cell. Thus, with respect to event-based triggering, the inter-frequency events (also frequently referred to in 3GPP as 2x events) corresponding to a HNB VAS are preferably triggered based on the measurements corresponding to just one HNB (e.g., one CSG cell). In other words, the frequency quality estimate is preferably restricted to only one cell as taught herein, and not a combination of cells.

Figure 4:
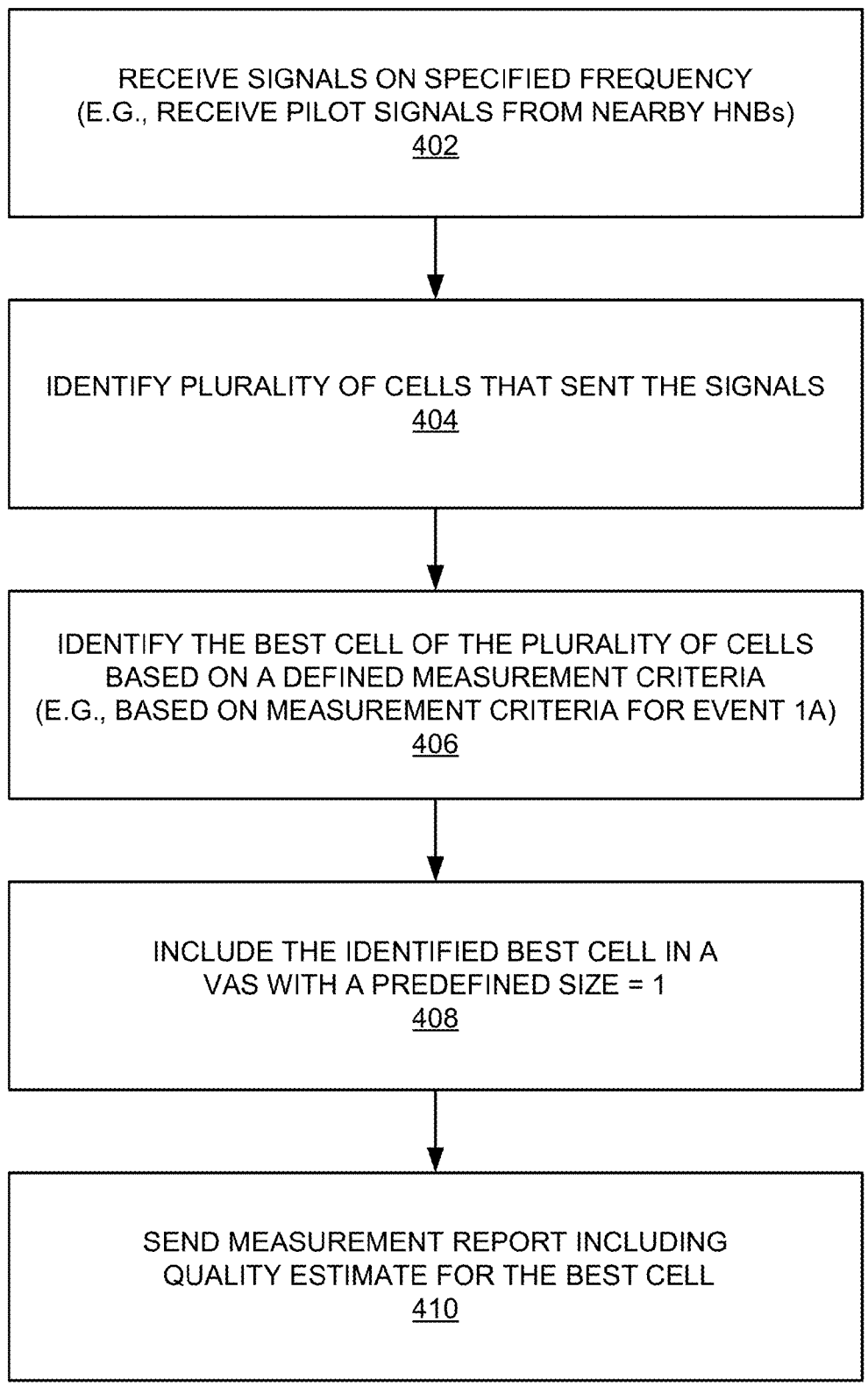
FIG. 4 is a flowchart of several sample aspects of operations that may be performed by an access terminal in conjunction with identifying a cell for a HNB VAS (CSG VAS) that has a size of 1.

FIG. 4 illustrates a more detailed example of how a HNB may be selected for a HNB VAS that has a predefined size of 1. This example describes one iteration of a process for identifying a best cell on one frequency. In practice, these operations are performed on a repeated basis (e.g., periodically) and for each non-used frequency.

As represented by block 402, at various points in time, the access terminal receives signals on a specified frequency. For example, the access terminal may conduct periodic measurements on a frequency specified by a measurement control message that was received from the network. In a case where there are nearby HNBs operating on that frequency, the access terminal will receive signals (e.g., pilot signals) from those HNBs.

As represented by block 404, the access terminal identifies a plurality of cells (HNBs) that sent the signals that were received at block 402. A HNB may be identified, for example, based on the PSC used by the HNB (e.g., for the pilot signal), based on a cell identifier included in the signal, or based on some other identification technique. For subsequent steps of the process of FIG. 4, only those HNBs that are listed in the CELL_INFO_CSG_LIST are considered.

As represented by blocks 406 and 408, the access terminal identifies the best cell of the plurality of cells that were identified at block 404 and includes that best cell in the HNB VAS. Here, the identification of the best cell is based on defined measurement criteria such as, for example, the measurement criteria specified for 3GPP Event 1a. Thus, the best cell may be defined based on which cell is associated with one or more of: the best signal power, the highest Ec/Io, the highest signal-to-noise ratio, the lowest path loss, or some other criterion.

In some cases, the identification of the best cell involves substituting a new cell for the cell that is currently in the HNB VAS. For example, an initial measurement may indicate that HNB 1 has the strongest received signal strength of all the HNBs under consideration, whereby HNB 1 is placed in the HNB VAS. A subsequent measurement may indicate, however, that HNB 2 has the strongest received signal strength of all the HNBs under consideration (e.g., including HNB 1). In this case, block 408 involves replacing HNB 1 with HNB 2.

Typically, the selection of a new best cell involves determining whether the measurements of a candidate best cell exceed the measurements of the current best cell based on certain criteria. For example, a change in the best cell may not be made unless the quality of the candidate best cell exceeds the quality of the current best cell by at least a defined amount for at least a defined period of time. This aspect of selecting a new best cell is described in more detail below in conjunction with block 508 of FIG. 5.

As represented by block 410 of FIG. 4, at some point in time, the access terminal sends a measurement report including the quality estimate for the sole HNB in the HNB VAS (the best cell) to the network. The sending of this report may be triggered based on various criteria as discussed herein. For example, a report may be sent whenever the estimated quality associated with the HNB in the HNB VAS exceeds a threshold. As another example, a report may be sent whenever a new HNB is switched into the HNB VAS.

As mentioned above, in some implementations, a dedicated HNB VAS may be allowed to have more than one HNB. For example, it may be desired to preserve the potential for future 3GPP systems to implement soft handover to Home NodeBs, from Home NodeBs, and between Home NodeBs. Thus, in accordance with the teachings herein, a HNB VAS (e.g., a Home NodeB VAS) need not be restricted to a size of only one cell. In this case, the access terminal is configured to select one cell from among a plurality of HNBs in the HNB VAS from which to base the frequency quality estimate. According to a further aspect of the disclosure, the frequency quality estimate is based on the best cell in the HNB VAS (e.g., the cell with the highest measurement result).

Figure 5:
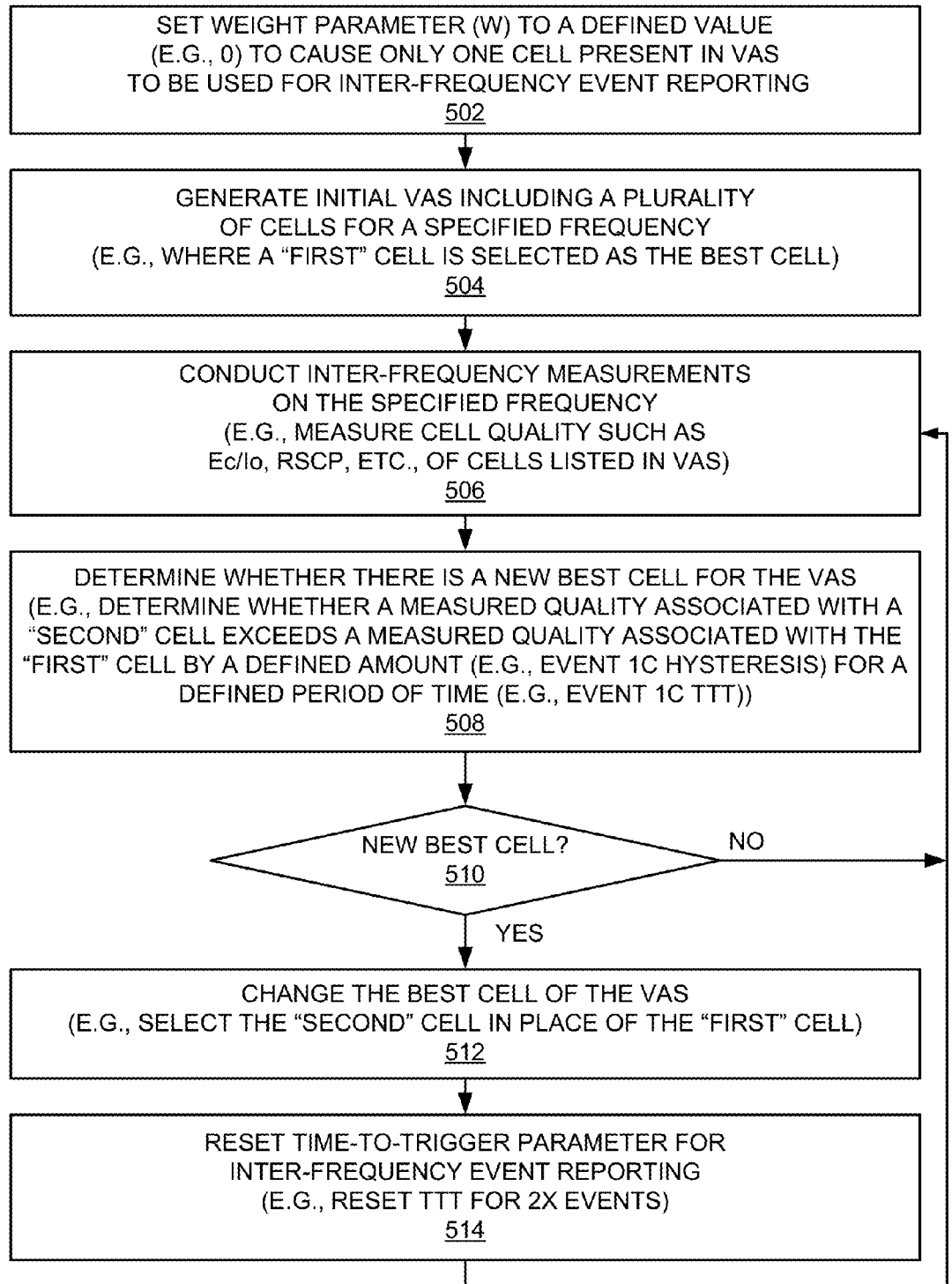
FIG. 5 is a flowchart of several sample aspects of operations that may be performed in conjunction with a change in the best cell of a HNB VAS (CSG VAS) that is not restricted to a size of 1.

FIG. 5 illustrates a scheme where a HNB VAS is not restricted to a size of 1. In this example, the frequency quality estimate is limited to a measurement quantity associated with the best cell of the HNB VAS by controlling the weight parameter W described in Equation 1 below. Equation 1 describes the computation of a frequency quality estimate for cells in a VAS corresponding to frequency j, as defined in TS 25.331, Section 14.2.0b.

$$Q_{frequency\,j} = 10 \cdot \log M_{frequency\,j} =$$

$$W_j \cdot 10 \cdot \log\left(\sum_{i=1}^{N_{Aj}} M_{ij}\right) + (1 - W_j) \cdot 10 \cdot \log M_{Best\,j},$$

EQUATION 1 where:

$Q_{frequency\,j}$ is the estimated quality of the VAS on frequency j;

$M_{frequency\,j}$ is the estimated quality of the VAS on frequency j;

$M_{i,j}$ is a measurement result of cell i in the VAS on frequency j;

$N_{A,j}$ is the number of cells in the VAS on frequency j;

$M_{Best\,j}$ is the measurement result of the cell in the VAS on frequency j with the highest measurement result; and $W_j$ is a parameter sent from UTRAN to a UE and used for frequency j.

Conventionally, the parameter W is provided from the network to the access terminal and is used in the calculation of the frequency quality estimate. Specifically, the W parameter is used to enable the access terminal to weigh cells in the active set or the VAS differently when calculating the frequency quality estimate. Thus, when the cells in the VAS are combined to obtain the frequency quality estimate, the cells are weighed according to the parameter W. Measurements corresponding to the best cell at a particular frequency are multiplied by (1−W), and measurements corresponding to each of the remaining cells at that frequency are multiplied directly by W.

Thus, setting the parameter W to zero causes the frequency quality estimate to be equivalent to the measurement result of the cell in the HNB VAS on that frequency with the best measurement result. That is, if the parameter W is set to 0, then the access terminal will only consider the measurement obtained from the best cell, and will give a weight of 0 to all other cells in the HNB VAS. Using this mechanism, the size of the HNB VAS may be configurable, and may take values of greater than one cell; however, the frequency quality estimate depends only upon one cell (e.g., the best cell) in the HNB VAS when W is set to 0.

However, since a HNB may be a very small cell, the HNB's quality as seen by a non-stationary access terminal may increase and decrease very rapidly. This may introduce instability into the frequency quality estimate because it is likely that such an estimate that only depends on one HNB may fluctuate more rapidly over time than an estimate that depends on a number of cells. With such a potentially unstable and fluctuating frequency quality estimate, it is possible that 2× events (that are triggered by this estimate) may be triggered prematurely or wholly unnecessarily. These undesirable triggers, in turn, may lead to unnecessary measurement report messages being transmitted by the access terminal, and other unwanted consequences.

Therefore, according to an aspect of the present disclosure, when the parameter W is set to 0, a timer that is being used to count the TTT for the 2× event may be reset whenever the cell designated as the "best" cell in the HNB VAS changes. For example, if the TTT timer is counting to 300 ms, the timer may be reset to zero and start its count over again whenever the best cell in the HNB VAS changes. In this fashion, the TTT may be extended such that, even though the frequency quality estimate for a particular HNB VAS exceeds the corresponding threshold for a time greater than the TTT, the 2× event is not triggered until the frequency quality estimate for that HNB VAS exceeds the threshold, and the cell designated as the best cell in the HNB VAS does not change, for a time greater than the TTT.

According to a further aspect of the present disclosure, also applicable when the parameter W is set to 0, the changing of the cell designated as the best cell in the HNB VAS uses the hysteresis and TTT specified for 3GPP Event 1c. As discussed above, Event 1c is an event triggered in the access terminal which results in a cell being replaced in a VAS. An example of the hysteresis for Event 1c is described in 3GPP TS 25.331, Section 14.1.5.1. An example of the time-to-trigger (TTT) of Event 1c is described in 3GPP TS 25.331, Section 14.1.5.2.

In general, hysteresis is employed to add a suitable quantity to the threshold that is used to determine if the measurement quantity of a cell exceeds that of the best cell in the HNB VAS. Using hysteresis makes the selection of a new best cell more stable and less susceptible to small-valued fluctuations in the measurement quantities of HNB signals. Further, using the TTT of Event 1c further stabilizes the designation of the best cell in the HNB VAS. That is, short-duration fluctuations in the measurement quantities associated with HNB signals are prevented from causing a change in the designation of a best cell in cases where these fluctuations do not exceed the duration of the TTT.

In some aspects of the disclosure, the hysteresis may be combined with the TTT such that the measurement quantity of a candidate best cell must exceed the measurement quantity of the current best cell by the hysteresis amount for a duration at least equal to the TTT to become designated as a new best cell in the HNB VAS. In other aspects of the disclosure, the hysteresis may be combined with the TTT such that once the measurement quantity of the candidate best cell exceeds the measurement quantity of the current best cell by the hysteresis amount, a timer starts, and as long as the measurement quantity of the candidate best cell exceeds the corresponding measurement quantity of the current best cell (i.e., not necessarily greater than the hysteresis amount for the entire time) for a duration at least equal to the TTT, the candidate best cell will become the new best cell in the HNB VAS.

Thus, to summarize, according to some aspects of the present disclosure, the parameter W is set to 0 when desired. When the parameter W is set to 0, a timer used to determine a TTT for a 2× event is reset when the cell designated as the best cell in the HNB VAS changes. Further, when the parameter W is set to 0, the determination to change the cell designated as the best cell in the HNB VAS uses the same hysteresis and TTT as used in Event 1c.

Referring to FIG. 5, sample operations that may be performed by an access terminal to provide the above functionality will now be described. This example describes the operations performed for one frequency. In practice, these operations are performed on a repeated basis (e.g., periodically) for each non-used frequency.

As represented by block 502, a weight parameter is set to a defined value (e.g., a zero value) to cause only one cell (HNB) present in the HNB VAS to be used for inter-frequency event reporting. For example, if the weight parameter W of Equation 1 is set to 0, the resulting quality estimate for frequency j is based solely on a measurement of the best cell of the HNB VAS for frequency j. In some implementations, the network (e.g., an RNC) configures the weight parameter used by the access terminals in the network by sending an appropriate configuration message. For example, the network may send a measurement control message that includes an IE that specifies the value of the weight parameter.

As represented by block 504, the access terminal conducts measurements to generate the initial HNB VAS for the specified frequency, whereby the HNB VAS is allowed to include more than one cell (HNB). As discussed herein, the number of HNBs in the HNB VAS may depend on a defined maximum size for the HNB VAS and on the number of HNBs listed in the CELL_INFO_CSG_LIST that are in the vicinity of the access terminal and are, therefore, measurable by the access terminal. In addition, an initial best cell of the HNB VAS is identified.

Blocks 506-514 describe sample operations where the access terminal repeatedly (e.g., periodically) measures cell quality on a given non-used frequency and updates the best cell of the HNB VAS whenever such an update is called for. As represented by block 506, the access terminal conducts measurements on the specified frequency as discussed herein (e.g., measuring Ec/Io or RSCP of pilot signals from HNBs).

As represented by blocks 508 and 510, the access terminal determines whether there is a new best cell for the HNB VAS. For example, the access terminal may determine whether a measured quality (e.g., corresponding to at least one measurement criterion specified for 3GPP Event 1a) associated with a candidate best cell exceeds a measured quality associated with the current best cell by at least a defined amount for at least a defined period of time. As discussed above, this defined amount may comprise the hysteresis parameter defined for Event 1c and this defined period of time may comprise the TTT parameter defined for Event 1c.

As represented by block 512, if the test of block 508 is met, the access terminal changes the best cell for the HNB VAS. As represented by block 514, in conjunction with this change, the access terminal resets the TTT parameter for inter-frequency event reporting (e.g., resets TTT for 2× events).

Figure 6:
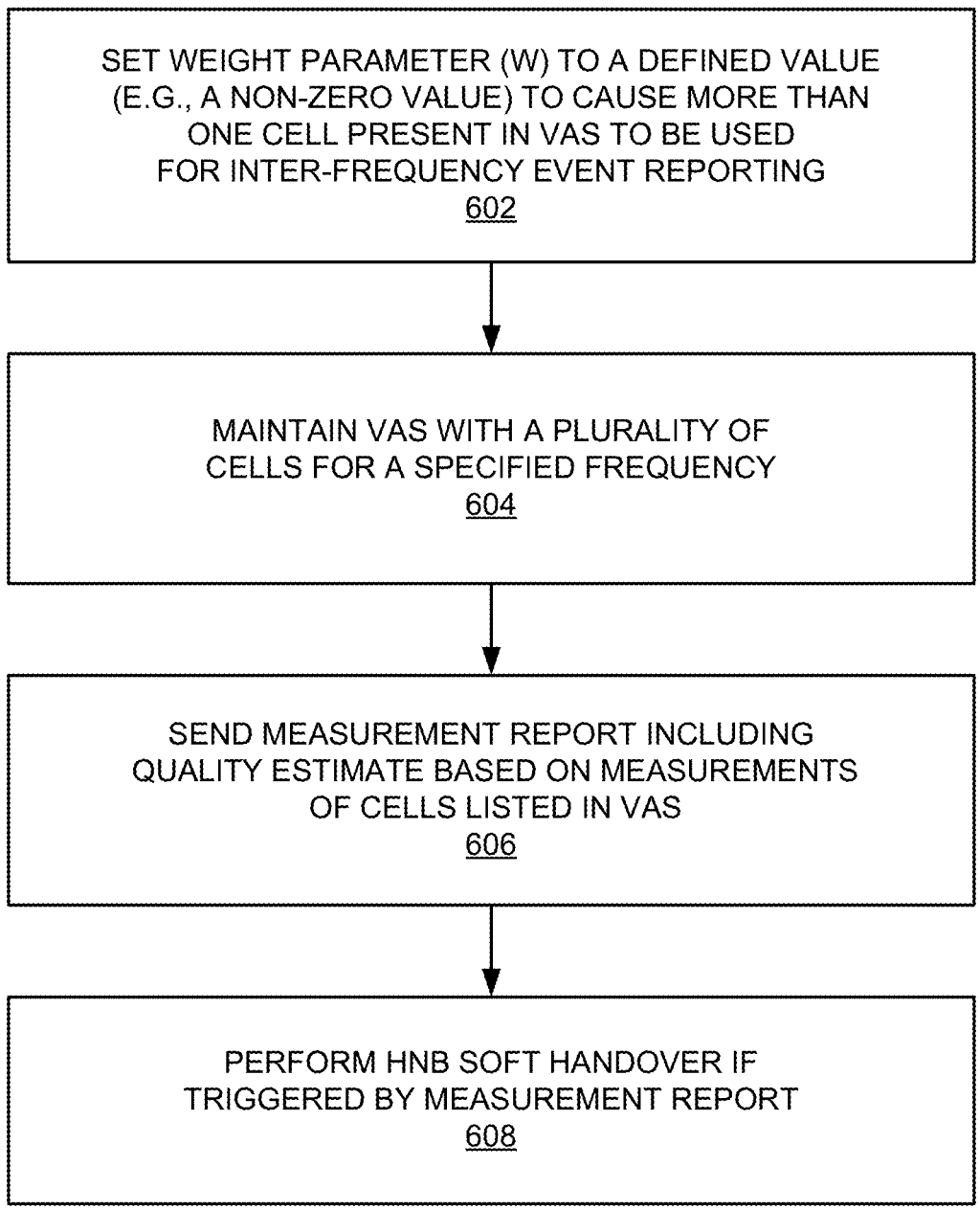
FIG. 6 is a flowchart of several sample aspects of operations that may be performed in conjunction with maintaining a HNB VAS (CSG VAS) with multiple HNBs (CSG cells)

Referring now to FIG. 6, a system that uses Equation 1 or a similar algorithm to generate a frequency quality estimate as discussed above may readily switch to a scheme whereby the frequency quality estimate is based on measurement quantities associated with more than one of the HNBs in the HNB VAS. For example, by setting the weight parameter W of Equation 1 to a non-zero value, measurement quantities of all of the HNBs in the HNB VAS are taken into account to provide the frequency quality estimate. In this way, such a system may be configurable to support soft handover to, from, and between Home NodeBs or other similar cells (e.g., in the event this soft handover is supported in a future version of the 3GPP standard).

Accordingly, as represented by block 602, a weight parameter is set to a defined value (e.g., a non-zero value) to cause more than one cell (HNB) present in the HNB VAS to be used for inter-frequency event reporting. For example, if the weight parameter W of Equation 1 is set to 0.5, a weight of 0.5 is applied to the best cell of the HNB VAS and to the remaining cells of the HNB VAS. Thus, the resulting quality estimate for frequency j is based on a measurement of each cell of the HNB VAS.

As represented by block 604, the access terminal therefore maintains a HNB VAS for each specified frequency, whereby each HNB VAS is allowed to include more than one HNB. When the parameter W is not set to 0, the techniques described above relating to hysteresis and TTT need not be used. That is, the resetting of a timer corresponding to the TTT of the 2× event when the best cell in the HNB VAS changes, and the hysteresis and the TTT of Event 1c being used for the change of the best cell in the HNB VAS, may not apply.

As represented by block 606, measurement reports sent by the access terminal may thus be based on measurements of multiple cells listed in the HNB VAS. For example, when Equation 1 is used, the frequency quality estimates reported in the reports may be based on weighted measurements of all of the cells of the HNB VAS. Moreover, the trigger for sending a measurement report may be based on comparison of such a frequency quality estimate with a threshold.

In implementations that support soft handover for HNBs, the access terminal may maintain a connection (e.g., a radio link) with each cell listed in the access terminal's active set, where the active set also may include HNBs. Consequently, a trigger for performing a HNB soft handover (block 608) may be based on comparison of: 1) a frequency quality estimate for a non-used frequency that may be based on measurements of multiple HNBs; with 2) a frequency quality estimate for the used frequency that also may be based on measurements of multiple HNBs.

The VAS-related techniques described herein may be implemented in a variety of ways in different implementations. For example, the teachings herein may be employed in different types of networks (e.g., other than UMTS or LTE). Also, different types of parameters (e.g., other than the CELL_INFO_CSG_LIST) may be used to maintain a HNB VAS.

The teachings herein may be applicable to other types of cells and access points. For example, a dedicated VAS may be maintained for some other types of cells and access points that support restricted access (e.g., restricted access that is not based on the CSG concept) or smaller coverage areas. Also, a plurality of dedicated VASs may be maintained for different types of cells. For example, a dedicated CSG VAS may only include CSG cells, a dedicated hybrid VAS may only include hybrid cells, a dedicated open HNB VAS may only include open HNBs, and so on. Accordingly, it should be understood that the structure and operations described herein with reference to a HNB and a HNB VAS may be equally applicable to some other type of cell and VAS.

FIG. 7 illustrates several sample components (represented by corresponding blocks) that may be incorporated into nodes such as an access terminal 702 and a network entity 704 (e.g., corresponding to the access terminal 102 and the network entity 112, respectively, of FIG. 1) to perform handover-related operations as taught herein. The described components also may be incorporated into other nodes in a communication system. For example, other nodes in a system may include components similar to those described for the access terminal 702 and the network entity 704 to provide similar functionality. Also, a given node may contain one or more of the described components. For example, an access terminal may contain multiple transceiver components that enable the access terminal to operate on multiple frequencies (e.g., operate on different frequency bands associated with different nominal carrier frequencies) and/or communicate via different technologies.

As shown in FIG. 7, the access terminal 702 includes a transceiver 706 for communicating with other nodes. The transceiver 706 may include one or more transmit chains each of which includes a transmitter 708 for sending signals (e.g., messages, indications), and one or more receive chains each of which includes a receiver 710 for receiving signals (e.g., messages, indications, pilot signals).

The network entity 704 includes a network interface 712 for communicating with other nodes (e.g., network entities). For example, the network interface 712 may be configured to communicate with one or more network entities via a wire-based or wireless backhaul. In some aspects, the network interface 712 may be implemented as a transceiver (e.g., including transmitter and receiver components) configured to support wire-based or wireless communication. Accordingly, in the example of FIG. 7, the network interface 712 is shown as comprising a transmitter 714 for transmitting signals (e.g., messages) and a receiver 716 for receiving signals (e.g., messages).

The access terminal 702 and the network entity 704 also include other components that may be used in conjunction with handover-related operations as taught herein. For example, the access terminal 702 may include a handover controller 718 for performing handover-related operations (e.g., maintaining a VAS for HNBs, identifying cells, identifying a best cell, including the best cell in the VAS, calculating a frequency quality estimate, setting a weight parameter to a defined value, selecting a cell as a best cell, changing the best cell, resetting a TTT parameter) and for providing other related functionality as taught herein. Similarly, the network entity 704 may include a handover controller 720 for performing handover-related operations (e.g., configuring access terminals, initiating handover, instructing an access terminal to maintain a VAS for HNBs, defining and providing cell information for a CELL_INFO_CSG_LIST, defining and sending a weight parameter) and for providing other related functionality as taught herein. The access terminal 702 and the network entity 704 also may include communication controllers 722 and 724, respectively, for controlling communications (e.g., sending and receiving messages) and for providing other related functionality as taught herein. Also, the access terminal 702 and the network entity 704 include memory components 726 and 728 (e.g., each including a memory device), respectively, for maintaining information (e.g., active set and VAS information, CELL_INFO_CSG_LIST information, weight parameter information).

For convenience the access terminal 702 and the network entity 704 are shown in FIG. 7 as including components that may be used in the various examples described herein. In practice, the functionality of one or more of these blocks may be different in different embodiments. For example, the functionality of block 718 may be different in a deployment implemented according to FIG. 5 as compared to a deployment implemented according to FIG. 6.

The components of FIG. 7 may be implemented in various ways. In some implementations the components of FIG. 7 may be implemented in one or more circuits such as, for example, one or more processors and/or one or more ASICs (which may include one or more processors). Here, each circuit (e.g., processor) may use and/or incorporate data memory for storing information or executable code used by the circuit to provide this functionality. For example, some of the functionality represented by block 706 and some or all of the functionality represented by blocks 718 and 722 may be implemented by a processor or processors of an access terminal and data memory of the access terminal (e.g., by execution of appropriate code and/or by appropriate configuration of processor components). Similarly, some of the functionality represented by block 712 and some or all of the functionality represented by blocks 720 and 724 may be implemented by a processor or processors of a network entity and data memory of the network entity (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 8:
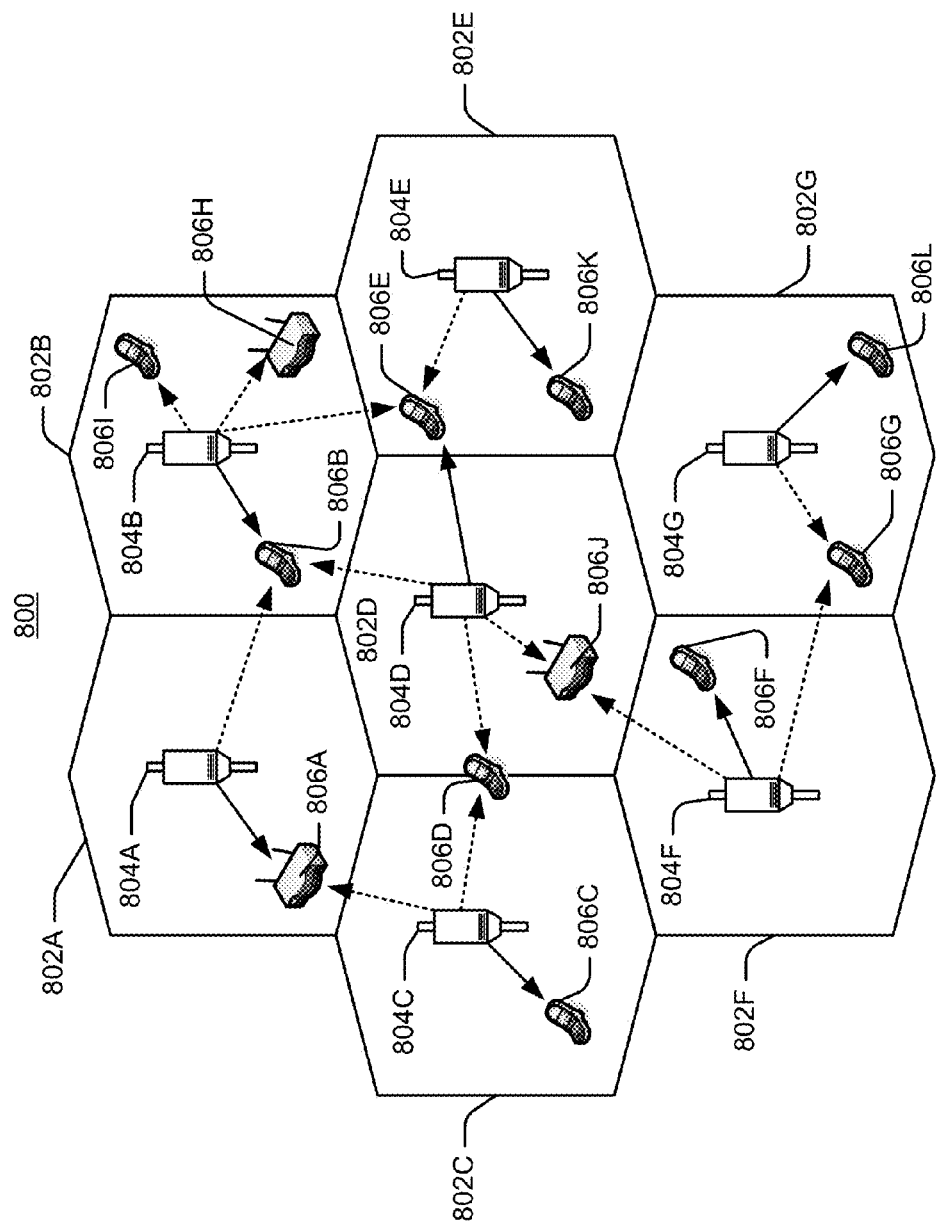
FIG. 8 is a simplified diagram of a wireless communication system.

FIG. 8 illustrates a wireless communication system 800, configured to support a number of users, in which the teachings herein may be implemented. The system 800 provides communication for multiple cells 802, such as, for example, macro cells 802A-802G, with each cell being serviced by a corresponding access point 804 (e.g., access points 804A-804G). As shown in FIG. 8, access terminals 806 (e.g., access terminals 806A-806L) may be dispersed at various locations throughout the system over time. Each access terminal 806 may communicate with one or more access points 804 on a forward link (FL) and/or a reverse link (RL) at a given moment, depending upon whether the access terminal 806 is active and whether it is in soft handoff, for example. The wireless communication system 800 may provide service over a large geographic region. For example, macro cells 802A-802G may cover a few blocks in a neighborhood or several miles in a rural environment.

Figure 9:
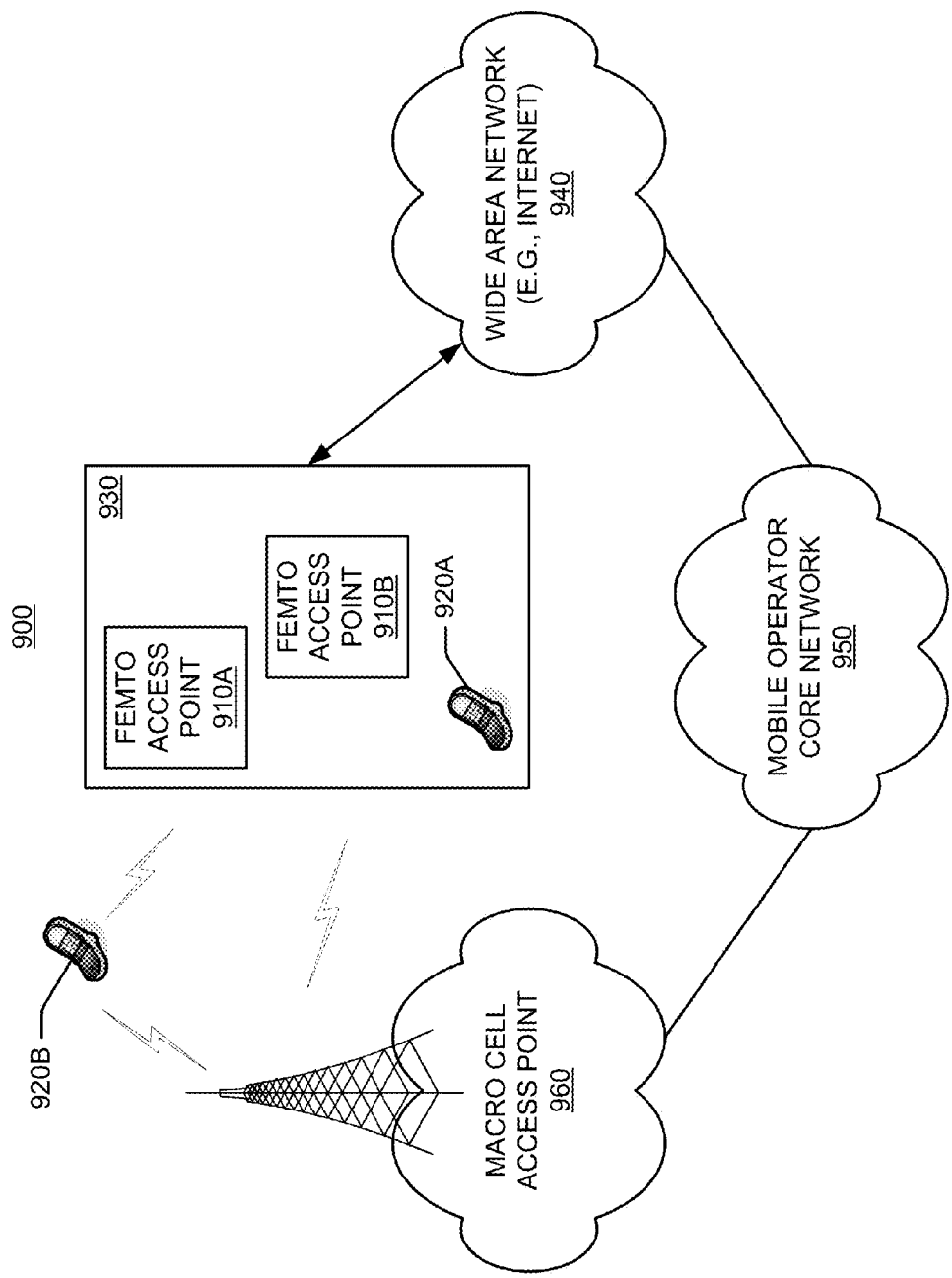
FIG. 9 is a simplified diagram of a wireless communication system including femto nodes.

FIG. 9 illustrates an exemplary communication system 900 where one or more femto access points (HNBs) are deployed within a network environment. Specifically, the system 900 includes multiple femto access points 910 (e.g., femto access points 910A and 910B) installed in a relatively small scale network environment (e.g., in one or more user residences 930). Each femto access point 910 may be coupled to a wide area network 940 (e.g., the Internet) and a mobile operator core network 950 via a DSL router, a cable modem, a wireless link, or other connectivity means (not shown). As will be discussed below, each femto access point 910 may be configured to serve associated access terminals 920 (e.g., access terminal 920A) and, optionally, other (e.g., hybrid or alien) access terminals 920 (e.g., access terminal 920B). In other words, access to femto access points 910 may be restricted whereby a given access terminal 920 may be served by a set of designated (e.g., home) femto access point(s) 910 but may not be served by any non-designated femto access points 910 (e.g., a neighbor's femto access point 910).

Figure 10:
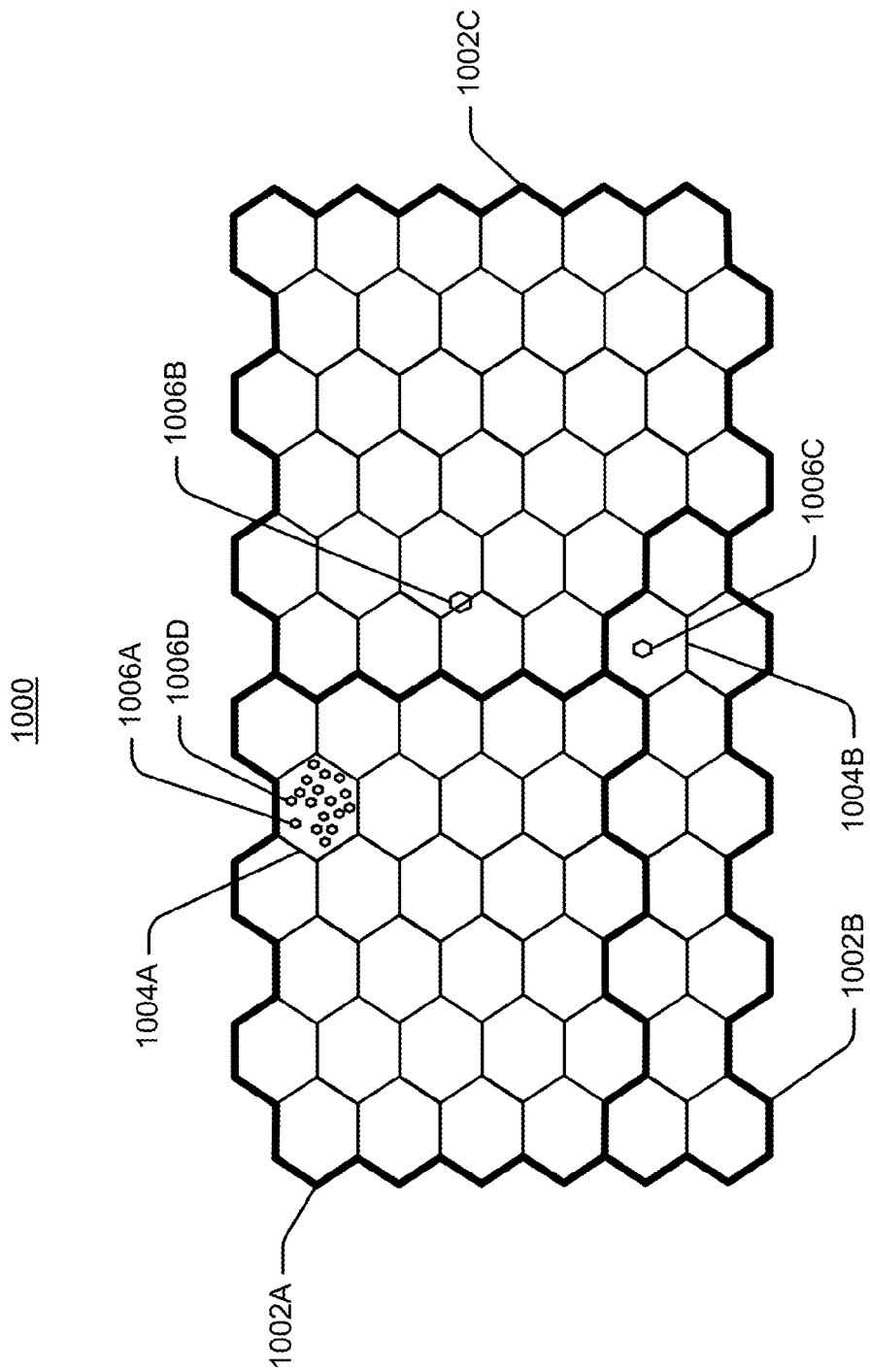
FIG. 10 is a simplified diagram illustrating coverage areas for wireless communication.

FIG. 10 illustrates an example of a coverage map 1000 where several tracking areas 1002 (or routing areas or location areas) are defined, each of which includes several macro coverage areas 1004. Here, areas of coverage associated with tracking areas 1002A, 1002B, and 1002C are delineated by the wide lines and the macro coverage areas 1004 are represented by the larger hexagons. The tracking areas 1002 also include femto coverage areas 1006. In this example, each of the femto coverage areas 1006 (e.g., femto coverage areas 1006B and 1006C) is depicted within one or more macro coverage areas 1004 (e.g., macro coverage areas 1004A and 1004B). It should be appreciated, however, that some or all of a femto coverage area 1006 may not lie within a macro coverage area 1004. In practice, a large number of femto coverage areas 1006 (e.g., femto coverage areas 1006A and 1006D) may be defined within a given tracking area 1002 or macro coverage area 1004. Also, one or more pico coverage areas (not shown) may be defined within a given tracking area 1002 or macro coverage area 1004.

Referring again to FIG. 9, the owner of a femto access point 910 may subscribe to mobile service, such as, for example, 3G mobile service, offered through the mobile operator core network 950. In addition, an access terminal 920 may be capable of operating both in macro environments and in smaller scale (e.g., residential) network environments. In other words, depending on the current location of the access terminal 920, the access terminal 920 may be served by a macro cell access point 960 associated with the mobile operator core network 950 or by any one of a set of femto access points 910 (e.g., the femto access points 910A and 910B that reside within a corresponding user residence 930). For example, when a subscriber is outside his home, he is served by a standard macro access point (e.g., access point 960) and when the subscriber is at home, he is served by a femto access point (e.g., access point 910A). Here, a femto access point 910 may be backward compatible with legacy access terminals 920.

A femto access point 910 may be deployed on a single frequency or, in the alternative, on multiple frequencies. Depending on the particular configuration, the single frequency or one or more of the multiple frequencies may overlap with one or more frequencies used by a macro access point (e.g., access point 960).

In some aspects, an access terminal 920 may be configured to connect to a preferred femto access point (e.g., the home femto access point of the access terminal 920) whenever such connectivity is possible. For example, whenever the access terminal 920A is within the user's residence 930, it may be desired that the access terminal 920A communicate only with the home femto access point 910A or 910B.

In some aspects, if the access terminal 920 operates within the macro cellular network 950 but is not residing on its most preferred network (e.g., as defined in a preferred roaming list), the access terminal 920 may continue to search for the most preferred network (e.g., the preferred femto access point 910) using a better system reselection (BSR) procedure, which may involve a periodic scanning of available systems to determine whether better systems are currently available and subsequently acquire such preferred systems. The access terminal 920 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 910, the access terminal 920 selects the femto access point 910 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 910 that reside within the corresponding user residence 930). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_s$ independent channels, which are also referred to as spatial channels, where $N_s \leq \min\{N_T, N_R\}$. Each of the $N_s$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 11:
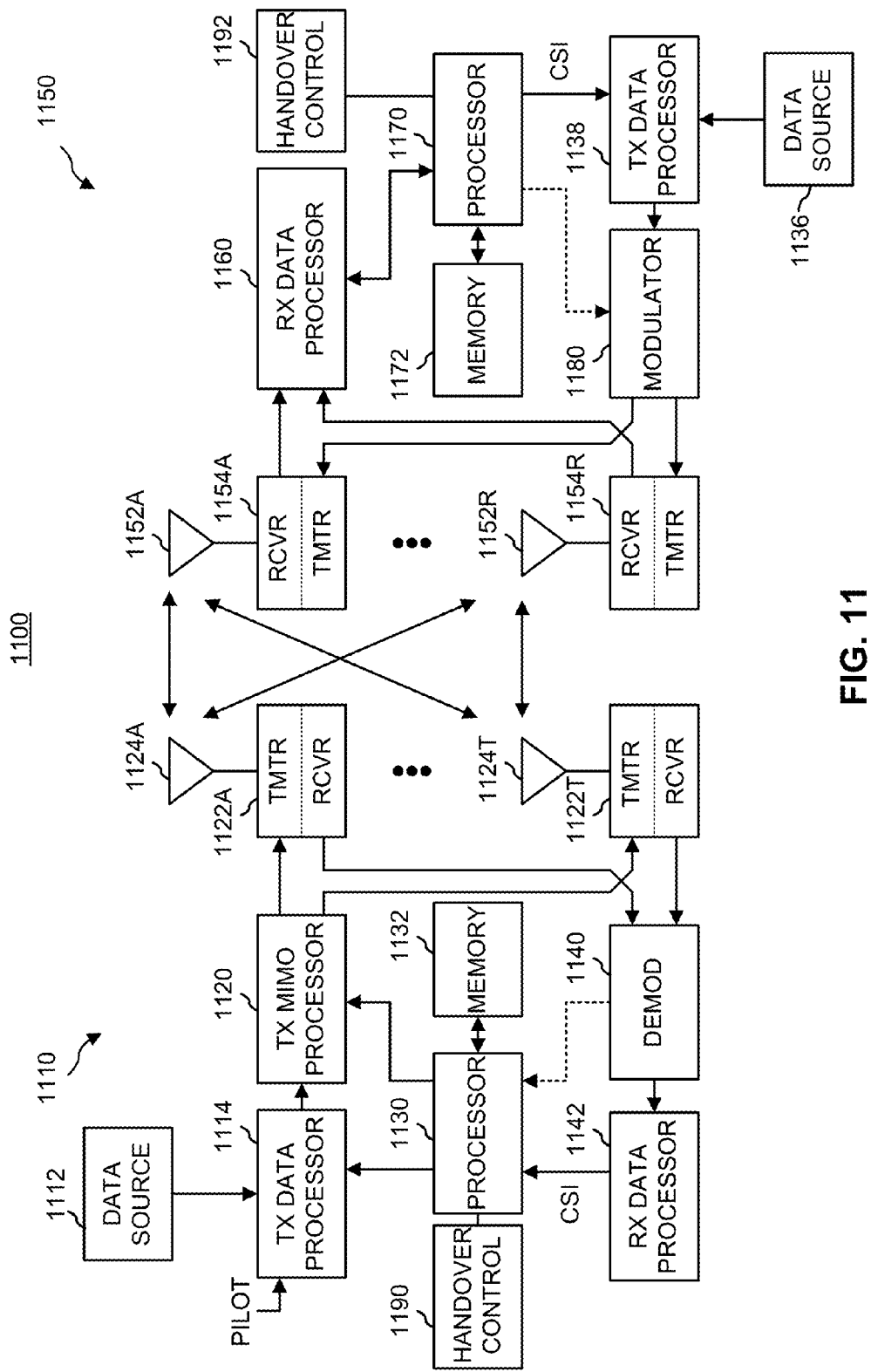
FIG. 11 is a simplified block diagram of several sample aspects of communication components.

FIG. 11 illustrates a wireless device 1110 (e.g., an access point) and a wireless device 1150 (e.g., an access terminal) of a sample MIMO system 1100. At the device 1110, traffic data for a number of data streams is provided from a data source 1112 to a transmit (TX) data processor 1114. Each data stream may then be transmitted over a respective transmit antenna.

The TX data processor 1114 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides $N_T$ modulation symbol streams to $N_T$ transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1122A through 1122T are then transmitted from $N_T$ antennas 1124A through 1124T, respectively.

At the device 1150, the transmitted modulated signals are received by $N_R$ antennas 1152A through 1152R and the received signal from each antenna 1152 is provided to a respective transceiver (XCVR) 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive (RX) data processor 1160 then receives and processes the $N_R$ received symbol streams from $N_R$ transceivers 1154 based on a particular receiver processing technique to provide $N_T$ "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which pre-coding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the device 1150 are received by the antennas 1124, conditioned by the transceivers 1122, demodulated by a demodulator (DEMOD) 1140, and processed by a RX data processor 1142 to extract the reverse link message transmitted by the device 1150. The processor 1130 then determines which pre-coding matrix to use for determining the beam-forming weights then processes the extracted message.

FIG. 11 also illustrates that the communication components may include one or more components that perform handover control operations as taught herein. For example, a handover control component 1190 may cooperate with the processor 1130 and/or other components of the device 1110 to facilitate handover of another device (e.g., device 1150). Similarly, a handover control component 1192 may cooperate with the processor 1170 and/or other components of the device 1150 to facilitate handover of the device 1150 to another device (not shown). It should be appreciated that for each device 1110 and 1150 the functionality of two or more of the described components may be provided by a single component. For example, a single processing component may provide the functionality of the handover control component 1190 and the processor 1130 and a single processing component may provide the functionality of the handover control component 1192 and the processor 1170.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

In some implementations, the teachings herein may be employed in a system based on the 3GPP Release 9 standard. In such a system, the terminology and definitions that follow are generally used. A Closed Subscriber Group identifies subscribers of an operator who are permitted to access one or more cells of the PLMN but which have restricted access (CSG cells). A CSG cell is a cell, part of the PLMN, that broadcasts a CSG Indicator that is set to TRUE and a specific CSG identity. A CSG cell is accessible by the members of the closed subscriber group for that CSG identity. A CSG Identity (CSG ID) is an identifier broadcast by a CSG/Hybrid cell or cells and used by a UE to facilitate access for authorized members of the associated Closed Subscriber Group. A Home NodeB is customer premise equipment that connects a 3GPP UE over a UTRAN wireless air interface to a mobile operator's network using a broadband IP backhaul. A non-CSG cell is a cell that is not a CSG cell, e.g., a macro cell. A PSC is a scrambling code that may be unique to each cell. The strongest cell is the cell on a particular carrier that is considered strongest according to the layer 1 cell search procedure. As the details of the layer 1 cell search are implementation dependent, the precise definition of 'strongest cell' is also implementation dependent.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home NodeB (HNB), a Home eNodeB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 12:
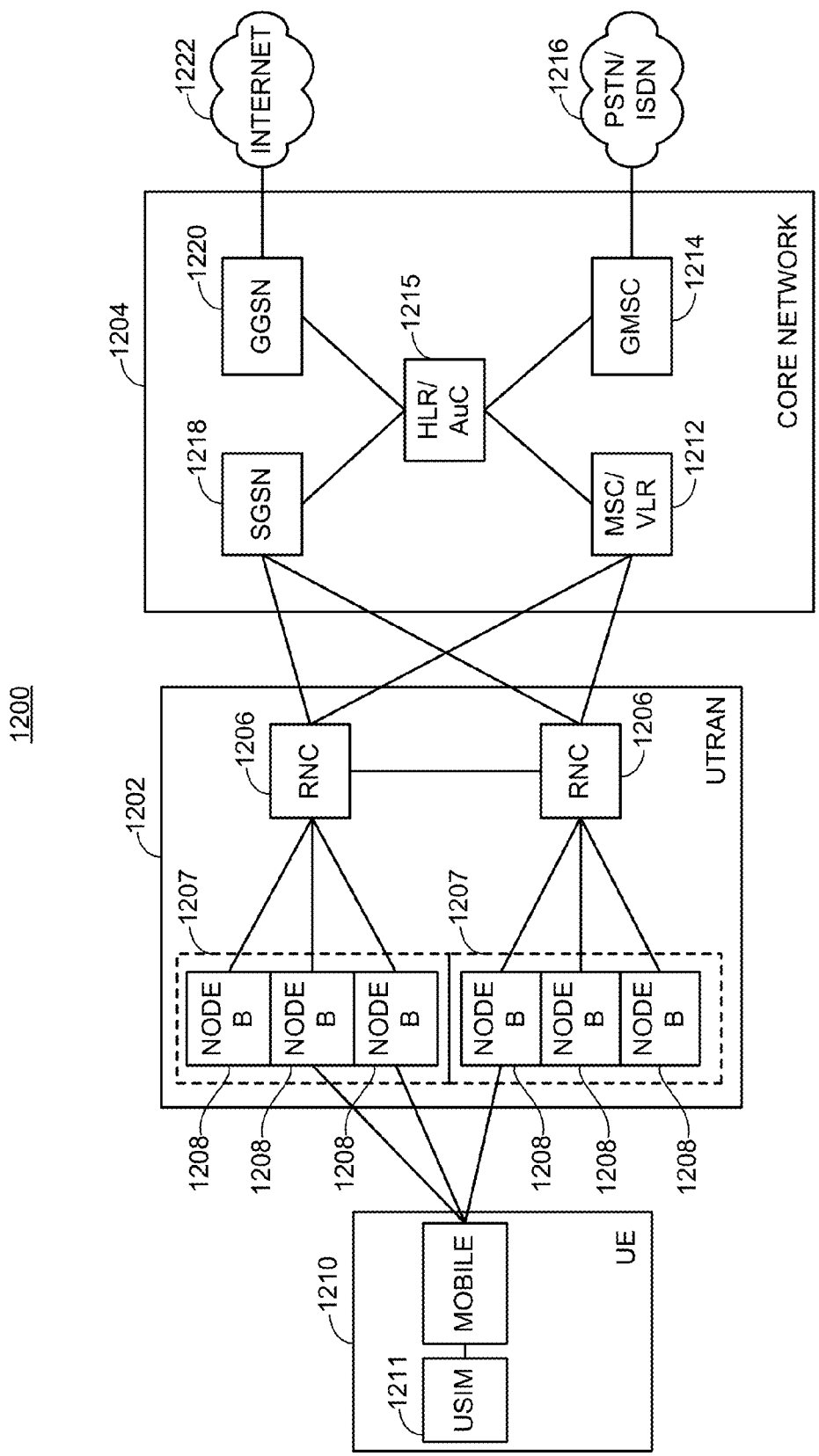
FIG. 12 is a simplified block diagram illustrating several sample aspects of a telecommunication system.

By way of example and without limitation, the teaching herein may be implemented in a UMTS system. FIG. 12 illustrates an example of a UMTS system 1200 employing a W-CDMA air interface. A UMTS network includes three interacting domains: a Core Network (CN) 1204, a UMTS Terrestrial Radio Access Network (UTRAN) 1202, and User Equipment (UE) 1210. In this example, the UTRAN 1202 provides various wireless services including telephony, video, data, messaging, broadcasts, and/or other services. The UTRAN 1202 may include a plurality of Serving Radio Network Subsystems (SRNSs) such as SRNSs 1207, each controlled by a respective Radio Network Controller (RNC) such as an RNC 1206. Here, the UTRAN 1202 may include any number of RNCs 1206 and SRNSs 1207 in addition to the RNCs 1206 and SRNSs 1207 illustrated herein. The RNC 1206 is an apparatus responsible for, among other things, assigning, reconfiguring and releasing radio resources within a given SRNS 1207. The RNC 1206 may be interconnected to other RNCs (not shown) in the UTRAN 1202 through various types of interfaces such as a direct physical connection, a virtual network, or the like, using any suitable transport network.

Communication between a UE 1210 and a Node B 1208 may be considered as including a physical (PHY) layer and a medium access control (MAC) layer. Further, communication between a UE 1210 and an RNC 1206 by way of a respective Node B 1208 may be considered as including a radio resource control (RRC) layer. In the instant specification, the PHY layer may be considered layer 1; the MAC layer may be considered layer 2; and the RRC layer may be considered layer 3. Information herein utilizes terminology introduced in Radio Resource Control (RRC) Protocol Specification, 3GPP TS 25.331 v9.1.0, which is hereby incorporated by reference herein.

The geographic region covered by a given SRNS 1207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 1208 are shown in each SRNS 1207; however, the SRNSs 1207 may include any number of wireless Node Bs. The Node Bs 1208 provide wireless access points to a core network (CN) 1204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 1210 may further include a universal subscriber identity module (USIM) 1211, which contains a user's subscription information to a network. For illustrative purposes, one UE 1210 is shown in communication with a number of the Node Bs 1208. The downlink (DL), also called the forward link, refers to the communication link from a Node B 1208 to a UE 1210, and the uplink (UL), also called the reverse link, refers to the communication link from a UE 1210 to a Node B 1208.

The core network 1204 interfaces with one or more access networks, such as the UTRAN 1202. As shown, the core network 1204 is a GSM core network. However, as those skilled in the art will recognize, the various concepts presented throughout this disclosure may be implemented in a RAN, or other suitable access network, to provide UEs with access to types of core networks other than GSM networks.

The core network 1204 includes a circuit-switched (CS) domain and a packet-switched (PS) domain. The circuit-switched elements include a Mobile Services Switching Centre (MSC), a Visitor Location Register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 1204 supports circuit-switched services with an MSC 1212 and a GMSC 1214. In some applications, the GMSC 1214 may be referred to as a media gateway (MGW). One or more RNCs, such as the RNC 1206, may be connected to the MSC 1212. The MSC 1212 is an apparatus that controls call setup, call routing, and UE mobility functions. The MSC 1212 also includes a visitor location register (VLR) that contains subscriber-related information for the duration that a UE is in the coverage area of the MSC 1212. The GMSC 1214 provides a gateway through the MSC 1212 for the UE to access a circuit-switched network 1216. The GMSC 1214 includes a home location register (HLR) 1215 containing subscriber data, such as the data reflecting the details of the services to which a particular user has subscribed. The HLR is also associated with an authentication center (AuC) that contains subscriber-specific authentication data. When a call is received for a particular UE, the GMSC 1214 queries the HLR 1215 to determine the UE's location and forwards the call to the particular MSC serving that location.

The core network 1204 also supports packet-data services with a serving GPRS support node (SGSN) 1218 and a gateway GPRS support node (GGSN) 1220. GPRS, which stands for General Packet Radio Service, is designed to provide packet-data services at speeds higher than those available with standard GSM circuit-switched data services. The GGSN 1220 provides a connection for the RAN 1202 to a packet-based network 1222. The packet-based network 1222 may be the Internet, a private data network, or some other suitable packet-based network. The primary function of the GGSN 1220 is to provide the UEs 1210 with packet-based network connectivity. Data packets are transferred between the GGSN 1220 and the UEs 1210 through the SGSN 1218, which performs primarily the same functions in the packet-based domain as the MSC 1212 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The W-CDMA air interface is based on such direct sequence spread spectrum technology and additionally calls for a frequency division duplexing (FDD). FDD uses a different carrier frequency for the uplink (UL) and downlink (DL) between a Node B 1208 and a UE 1210.

Figure 13:
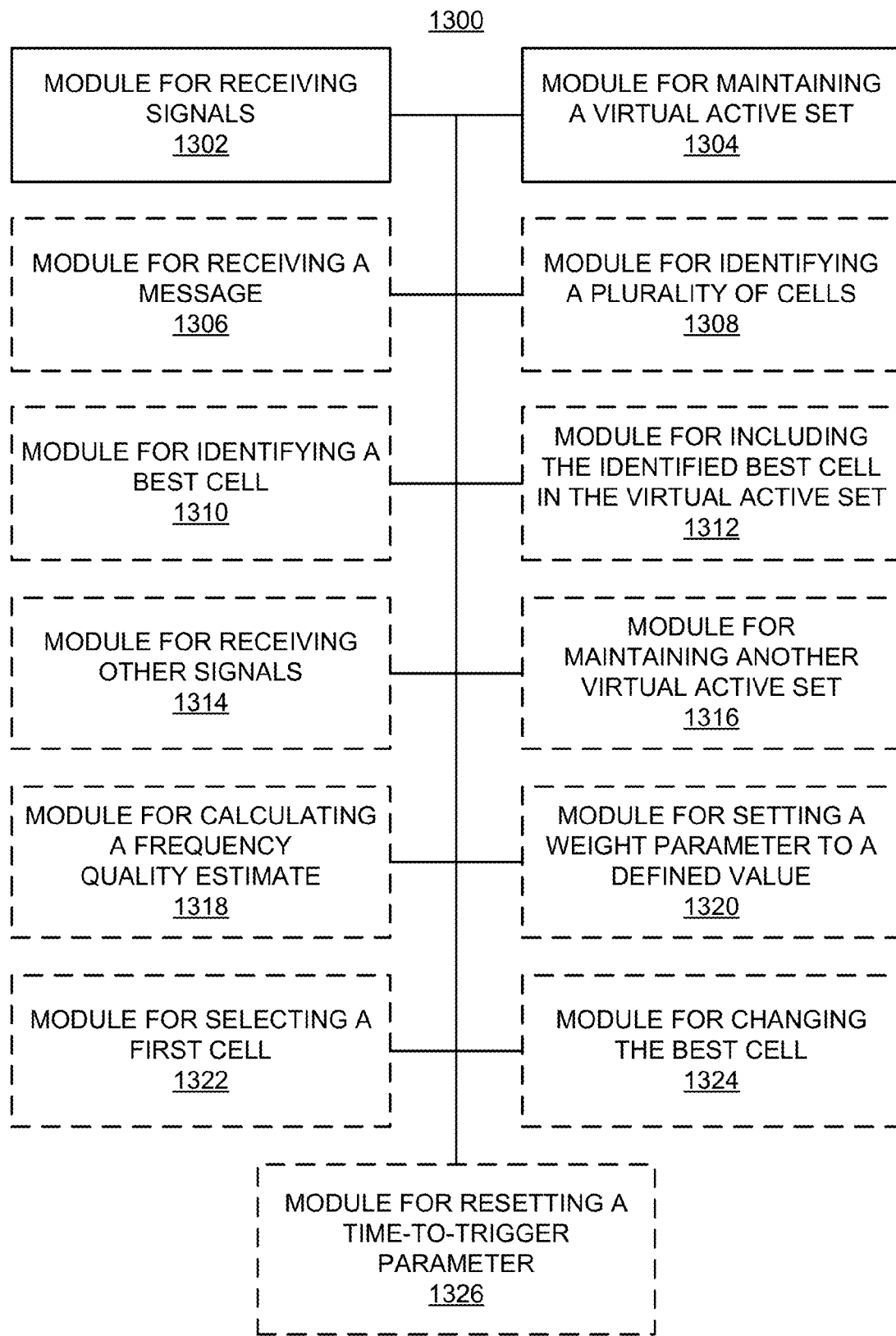
FIG. 13 is a simplified block diagram of several sample aspects of an apparatus configured to maintain a HNB VAS (CSG VAS) as taught herein.

The functionality described herein (e.g., with regard to one or more of the accompanying figures) may correspond in some aspects to similarly designated "means for" functionality in the appended claims. Referring to FIG. 13, an apparatus 1300 is represented as a series of interrelated functional modules. Here, a module for receiving signals 1302 may correspond at least in some aspects to, for example, a receiver as discussed herein. A module for maintaining a VAS 1304 may correspond at least in some aspects to, for example, a controller as discussed herein. A module for receiving a message 1306 may correspond at least in some aspects to, for example, a receiver as discussed herein. A module for identifying a plurality of cells 1308 may correspond at least in some aspects to, for example, a controller as discussed herein. A module for identifying a best cell 1310 may correspond at least in some aspects to, for example, a controller as discussed herein. A module for including the identified best cell in the VAS 1312 may correspond at least in some aspects to, for example, a controller as discussed herein. A module for receiving other signals 1314 may correspond at least in some aspects to, for example, a receiver as discussed herein. A module for maintaining another VAS 1316 may correspond at least in some aspects to, for example, a controller as discussed herein. A module for calculating a frequency quality estimate 1318 may correspond at least in some aspects to, for example, a controller as discussed herein. A module for setting a weight parameter to a defined value 1320 may correspond at least in some aspects to, for example, a controller as discussed herein. A module for selecting a best cell 1322 may correspond at least in some aspects to, for example, a controller as discussed herein. A module for changing the best cell 1324 may correspond at least in some aspects to, for example, a controller as discussed herein. A module for resetting a time-to-trigger parameter 1326 may correspond at least in some aspects to, for example, a controller as discussed herein.

The functionality of the modules of FIG. 13 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIG. 13 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" or "one or more of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
receiving signals on a specified frequency at an access terminal;
maintaining, based on the received signals, a first virtual active set that only includes cells present in a CELL_INFO_CSG_LIST, wherein the first virtual active set includes a plurality of cells;
receiving other signals on the specified frequency;
maintaining a second virtual active set for at least one other cell based on the received other signals, wherein the second virtual active set only includes cells present in a CELL_INFO_LIST;
selecting a first cell of the plurality of cells as a best cell of the first virtual active set;
changing the best cell of the first virtual active set by selecting a second cell of the plurality of cells in place of the first cell; and
resetting a time-to-trigger parameter for inter-frequency event reporting based on the change of the best cell.

2. The method of claim 1, wherein the cells present in the CELL_INFO_CSG_LIST comprise at least one of the group consisting of: closed subscriber group cells, hybrid cells, and open Home NodeBs.

3. The method of claim 1, further comprising receiving a message for configuring the CELL_INFO_CSG_LIST, wherein the message specifies which cells are allowed to be included in the first virtual active set.

4. The method of claim 1, further comprising calculating a frequency quality estimate for the inter-frequency event reporting based solely on the best cell of the first virtual active set.

5. The method of claim 1, wherein a weight parameter is defined for applying weighting to cell measurements for the inter-frequency event reporting, the method further comprising setting the weight parameter to a defined value to cause only the best cell present in the first virtual active set to be used for the inter-frequency event reporting.

6. The method of claim 5, wherein the defined value comprises a value of zero.

7. The method of claim 5, wherein the change of the best cell comprises determining whether a measured quality associated with the second cell exceeds a measured quality associated with the first cell by at least a defined amount for at least a defined period of time.

8. The method of claim 7, wherein:
the defined amount comprises a hysteresis parameter for a 3GPP Event 1c; and
the defined period of time comprises a time-to-trigger parameter for a 3GPP Event 1c.

9. The method of claim 1, wherein a weight parameter is defined for applying weighting to cell measurements for the inter-frequency event reporting, the method further comprising setting the weight parameter to a defined value to cause more than one cell present in the first virtual active set to be used for the inter-frequency event reporting.

10. The method of claim 9, wherein the defined value comprises a non-zero value.

11. The method of claim 9, wherein the weight parameter is set to the defined value to support soft handover operations.

12. An apparatus for communication, comprising:
a receiver operable to receive signals on a specified frequency; and
a controller operable to maintain, based on the received signals, a first virtual active set that only includes cells present in a CELL_INFO_CSG_LIST, wherein the first virtual active set includes a plurality of cells, wherein
the receiver is further operable to receive other signals on the specified frequency,
the controller is further operable to maintain a second virtual active set for at least one other cell based on the received other signals, the second virtual active set only including cells present in a CELL_INFO_LIST,
the controller is further operable to select a first cell of the plurality of cells as a best cell of the first virtual active set,
the controller is further operable to change the best cell of the first virtual active set by selecting a second cell of the plurality of cells in place of the first cell, and
the controller is further operable to reset a time-to-trigger parameter for inter-frequency event reporting based on the change of the best cell.

13. The apparatus of claim 12, wherein the cells present in the CELL_INFO_CSG_LIST comprise at least one of the group consisting of: closed subscriber group cells, hybrid cells, and open Home NodeBs.

14. The apparatus of claim 12, wherein the receiver is further operable to receive a message for configuring the CELL_INFO_CSG_LIST, wherein the message specifies which cells are allowed to be included in the first virtual active set.

15. The apparatus of claim 12, wherein the controller is further operable to calculate a frequency quality estimate for the inter-frequency event reporting based solely on the best cell of the first virtual active set.

16. The apparatus of claim 12, wherein:
a weight parameter is defined for applying weighting to cell measurements for the inter-frequency event reporting; and
the controller is further operable to set the weight parameter to a defined value to cause only the best cell present in the first virtual active set to be used for the inter-frequency event reporting.

17. The apparatus of claim 16, wherein the defined value comprises a value of zero.

18. The apparatus of claim 16, wherein the change of the best cell comprises determining whether a measured quality associated with the second cell exceeds a measured quality associated with the first cell by at least a defined amount for at least a defined period of time.

19. The apparatus of claim 18, wherein:
the defined amount comprises a hysteresis parameter for a 3GPP Event 1c; and
the defined period of time comprises a time-to-trigger parameter for a 3GPP Event 1c.

20. The apparatus of claim 12, wherein:
a weight parameter is defined for applying weighting to cell measurements for the inter-frequency event reporting; and
the controller is further operable to set the weight parameter to a defined value to cause more than one cell present in the first virtual active set to be used for the inter-frequency event reporting.

21. The apparatus of claim 20, wherein the defined value comprises a non-zero value.

22. The apparatus of claim 20, wherein the weight parameter is set to the defined value to support soft handover operations.

23. An apparatus for communication, comprising:
means for receiving signals on a specified frequency;
means for maintaining, based on the received signals, a first virtual active set that only includes cells present in a CELL_INFO_CSG_LIST, wherein the first virtual active set includes a plurality of cells;
means for receiving other signals on the specified frequency;
means for maintaining a second virtual active set for at least one other cell based on the received other signals, wherein the second virtual active set only includes cells present in a CELL_INFO_LIST;
means for selecting a first cell of the plurality of cells as a best cell of the first virtual active set;
means for changing the best cell of the first virtual active set by selecting a second cell of the plurality of cells in place of the first cell; and
means for resetting a time-to-trigger parameter for the inter-frequency event reporting based on the change of the best cell.

24. The apparatus of claim 23, wherein the cells present in the CELL_INFO_CSG_LIST comprise at least one of the group consisting of: closed subscriber group cells, hybrid cells, and open Home NodeBs.

25. The apparatus of claim 23, further comprising means for receiving a message for configuring the CELL_INFO_CSG_LIST, wherein the message specifies which cells are allowed to be included in the first virtual active set.

26. The apparatus of claim 23, wherein a weight parameter is defined for applying weighting to cell measurements for the inter-frequency event reporting, the apparatus further comprising means for setting the weight parameter to a defined value to cause only the best cell present in the first virtual active set to be used for the inter-frequency event reporting.

27. The apparatus of claim 26, wherein the defined value comprises a value of zero.

28. The apparatus of claim 26, wherein the change of the best cell comprises determining whether a measured quality associated with the second cell exceeds a measured quality associated with the first cell by at least a defined amount for at least a defined period of time.

29. The apparatus of claim 28, wherein:
the defined amount comprises a hysteresis parameter for a 3GPP Event 1c; and
the defined period of time comprises a time-to-trigger parameter for a 3GPP Event 1c.

30. A non-transitory computer-readable medium comprising code for causing a computer to:
receive signals on a specified frequency at an access terminal;
maintain, based on the received signals, a first virtual active set that only includes cells present in a CELL_INFO_CSG_LIST, wherein the first virtual active set includes a plurality of cells;
receive other signals on the specified frequency;
maintain a second virtual active set for at least one other cell based on the received other signals, wherein the second virtual active set only includes cells present in a CELL_INFO_LIST;
select a first cell of the plurality of cells as a best cell of the first virtual active set;
change the best cell of the first virtual active set by selecting a second cell of the plurality of cells in place of the first cell; and
reset a time-to-trigger parameter for the inter-frequency event reporting based on the change of the best cell.

31. The non-transitory computer-readable medium of claim 30, wherein the cells present in a CELL_INFO_CSG_LIST comprise at least one of the group consisting of: closed subscriber group cells, hybrid cells, and open Home NodeBs.

32. The non-transitory computer-readable medium of claim 30, wherein the computer-readable medium further comprises code for causing the computer to receive a message for configuring the CELL_INFO_CSG_LIST, wherein the message specifies which cells are allowed to be included in the first virtual active set.

33. The non-transitory computer-readable medium of claim 30, wherein:
a weight parameter is defined for applying weighting to cell measurements for the inter-frequency event reporting; and
the computer-readable medium further comprises code for causing the computer to set the weight parameter to a defined value to cause only the best cell present in the first virtual active set to be used for the inter-frequency event reporting.

34. The non-transitory computer-readable medium of claim 33, wherein the defined value comprises a value of zero.

35. The non-transitory computer-readable medium of claim 33, wherein the change of the best cell comprises determining whether a measured quality associated with the second cell exceeds a measured quality associated with the first cell by at least a defined amount for at least a defined period of time.

36. The non-transitory computer-readable medium of claim 35, wherein:
the defined amount comprises a hysteresis parameter for a 3GPP Event 1c; and
the defined period of time comprises a time-to-trigger parameter for a 3GPP Event 1c.

37. The method of claim 1, wherein resetting the time-to-trigger parameter restarts a corresponding timer.

38. The apparatus of claim 12, wherein resetting the time-to-trigger parameter restarts a corresponding timer.

39. The apparatus of claim 23, wherein resetting the time-to-trigger parameter restarts a corresponding timer.

40. The non-transitory computer-readable medium of claim 30, wherein resetting the time-to-trigger parameter restarts a corresponding timer.

41. The method of claim 1, wherein the cells present in the CELL_INFO_CSG_LIST comprise at least one of the group consisting of: hybrid cells and open Home NodeBs.

42. The apparatus of claim 12, wherein the cells present in the CELL_INFO_CSG_LIST comprise at least one of the group consisting of: hybrid cells and open Home NodeBs.

43. The apparatus of claim 23, wherein the cells present in the CELL_INFO_CSG_LIST comprise at least one of the group consisting of: hybrid cells and open Home NodeBs.

44. The non-transitory computer-readable medium of claim 30, wherein the cells present in a CELL_INFO_CSG_LIST comprise at least one of the group consisting of: hybrid cells and open Home NodeBs.

* * * * *